US008183316B2

(12) United States Patent
Goodman et al.

(10) Patent No.: US 8,183,316 B2
(45) Date of Patent: May 22, 2012

(54) CLAY MINERAL PRODUCTS AND THEIR USE IN RUBBER COMPOSITIONS

(75) Inventors: Howard Goodman, Cornwall (GB); Andrew Riley, Cornwall (GB)

(73) Assignee: Imerys Minerals Limited, Par Cornwall (GB)

(*) Notice: Subject to any disclaimer, the term of this patent is extended or adjusted under 35 U.S.C. 154(b) by 0 days.

(21) Appl. No.: 12/724,257

(22) Filed: Mar. 15, 2010

(65) Prior Publication Data
US 2010/0273913 A1 Oct. 28, 2010

Related U.S. Application Data

(63) Continuation of application No. 10/483,502, filed as application No. PCT/GB02/03180 on Jul. 11, 2002, now abandoned.

(30) Foreign Application Priority Data

Jul. 18, 2001 (GB) .................................. 0117500.9
Feb. 15, 2002 (GB) .................................. 0203711.7

(51) Int. Cl.
C08K 3/34 (2006.01)
C08K 9/06 (2006.01)
C08L 21/00 (2006.01)
B60C 1/00 (2006.01)
(52) U.S. Cl. ......... 524/445; 524/447; 524/847; 152/151
(58) Field of Classification Search .................. 524/445, 524/447, 847; 152/151
See application file for complete search history.

(56) References Cited

U.S. PATENT DOCUMENTS

| 4,133,797 | A | | 1/1979 | Tirpak et al. |
| 4,427,452 | A | * | 1/1984 | Jeffs .............................. 524/262 |
| 4,431,755 | A | | 2/1984 | Weber et al. |
| 4,522,970 | A | | 6/1985 | Scriver et al. |
| 4,810,578 | A | | 3/1989 | Prescott et al. |
| 5,116,886 | A | | 5/1992 | Wolff et al. |
| 5,244,958 | A | | 9/1993 | Goodman |
| 5,310,777 | A | | 5/1994 | Sekido et al. |
| 5,430,087 | A | | 7/1995 | Carlson et al. |
| 5,591,794 | A | | 1/1997 | Fukumoto et al. |
| 5,672,639 | A | | 9/1997 | Corvasce et al. |
| 5,780,531 | A | | 7/1998 | Scholl |
| 5,840,113 | A | | 11/1998 | Freeman et al. |
| 5,840,795 | A | | 11/1998 | Freeman et al. |
| 5,846,309 | A | | 12/1998 | Freeman et al. |
| 5,871,846 | A | | 2/1999 | Freeman et al. |
| 5,872,176 | A | | 2/1999 | Hergenrother et al. |
| 5,967,211 | A | | 10/1999 | Lucas et al. |
| 6,013,699 | A | | 1/2000 | Freeman et al. |
| 6,080,809 | A | | 6/2000 | Stuhldreher |
| 6,197,105 | B1 | | 3/2001 | Freeman et al. |
| 6,269,858 | B1 | | 8/2001 | Sandstrom |
| 6,342,560 | B1 | | 1/2002 | Okel |
| 6,525,118 | B2 | | 2/2003 | Hergenrother et al. |
| 6,610,261 | B1 | | 8/2003 | Custodero et al. |
| 6,649,684 | B1 | | 11/2003 | Okel |
| 2003/0144393 | A1 | | 7/2003 | Barruel et al. |

FOREIGN PATENT DOCUMENTS

| EP | 0 098 229 A1 | 1/1984 |
| EP | 0 099 710 A1 | 2/1984 |
| EP | 0 170 606 B1 | 2/1986 |
| EP | 0 178 079 A1 | 4/1986 |
| EP | 0 227 168 A2 | 7/1987 |
| EP | 0 420 307 A2 | 4/1991 |
| EP | 0 489 313 A1 | 6/1992 |
| EP | 0 506 290 A1 | 9/1992 |
| EP | 506290 A1 * | 9/1992 |
| EP | 0 655 480 A2 | 5/1995 |
| EP | 0 678 549 B1 | 10/1995 |
| EP | 0 697 432 A1 | 2/1996 |
| EP | 0 719 820 A1 | 7/1996 |
| EP | 0 732 362 A1 | 9/1996 |
| EP | 0 795 581 A1 | 9/1997 |
| EP | 0 845 493 A1 | 6/1998 |
| EP | 0 861 872 A1 | 9/1998 |
| EP | 0 875 532 A1 | 11/1998 |
| EP | 875532 A1 * | 11/1998 |
| EP | 0 890 602 A1 | 1/1999 |
| EP | 0 894 819 A1 | 2/1999 |

(Continued)

OTHER PUBLICATIONS

Okel, Timothy A.; Patkar, Shailesh D.; and Bice, Jo-Ann E., "Advances in Precipitated Silicas for Passenger and Truck Tyre Treads", Progress in Rubber and Plastics Technology, vol. 15, No. 1, 1999, pp. 1-27.

Knoedgen, Marita, "Dispersion and low mixing temperatures are the keys to high quality when silica-based compounds for tyre treads—The future is in the compound", European Rubber Journal, vol. 180, No. 9, Sep. 1998, pp. 34-35.

Wang, Meng-Jiao; Zhang, Ping; and Mahmud, Khaled, "Carbon-Silica Dual Phase Filler, A New Generation Reinforcing Agent for Rubber: Part IX. Application to Truck Tire Tread Compound", Rubber Chemistry and Technology, vol. 74, 2001, pp. 124-137.

Sutton, David M., "Air-floated Kaolins Can Enhance Compounds", Rubber & Plastics News, Apr. 5, 1999, pp. 32-35.

Primary Examiner — Kelechi Egwim
(74) Attorney, Agent, or Firm — Finnegan, Henderson, Farabow, Garrett & Dunner, L.L.P.

(57) ABSTRACT

Disclosed herein is a rubber composition comprising a rubber and particulate kaolin clay as a filler wherein: the kaolin particles have a particle size distribution such that at least about 95% of the particles, relative to the volume of the particles, have a particle diameter less than 3μm. The particulate kaolin particles may comprise calcined kaolin chosen from at least one of particulate soak calcined kaolin and particulate flash calcined kaolin. The rubber composition can comprise additional particulate fillers including those chosen from silica, carbon black, and other particulate fillers. Also disclosed herein is a process for producing such a composition, and the method of using a cured form of the composition in a rubber composition, such as a vehicle tire composition.

16 Claims, 13 Drawing Sheets

FOREIGN PATENT DOCUMENTS

| | | | |
|---|---|---|---|
| EP | 0 899 308 A1 | 3/1999 |
| EP | 0 933 391 A1 | 8/1999 |
| EP | 0 942 041 A1 | 9/1999 |
| EP | 0 943 648 A1 | 9/1999 |
| EP | 1 086 977 A2 | 3/2001 |
| EP | 1 142 954 A1 | 10/2001 |
| EP | 1 176 164 A1 | 1/2002 |
| EP | 1 195 402 A1 | 4/2002 |
| EP | 1 258 373 A2 | 11/2002 |
| GB | 2 067 535 B | 7/1981 |
| GB | 2 370 280 A | 6/2002 |
| JP | 60-139728 | 7/1985 |
| JP | 7149954 A | 6/1995 |
| JP | 8003373 A | 1/1996 |
| JP | 8311245 A | 11/1996 |
| JP | 9031250 A | 2/1997 |
| JP | 9255814 A | 9/1997 |
| JP | 11-181155 A | 7/1999 |
| WO | WO 87/07884 | 12/1987 |
| WO | WO 90/10032 | 9/1990 |
| WO | WO 98/10013 | 3/1998 |
| WO | WO 98/45374 | 10/1998 |
| WO | WO 98/56598 | 12/1998 |
| WO | WO 99/28376 | 6/1999 |
| WO | WO 00/39198 | 7/2000 |
| WO | WO 00/73092 A1 | 12/2000 |
| WO | WO 01/12731 A1 | 2/2001 |
| WO | WO 02/088259 A1 | 11/2002 |

* cited by examiner

CLAY MINERAL PRODUCTS AND THEIR USE IN RUBBER COMPOSITIONS

This is a continuation of U.S. application Ser. No. 10/483,502, filed Aug. 9, 2004 now abandoned, which is a U.S. national phase entry under 35 U.S.C. §371 based on PCT Application No. PCT/GB02/03180, filed Jul. 11, 2002, which claims the benefit of priority of Great Britain Application No. 0117500.9, filed Jul. 18, 2001, and Great Britain Application No. 0203711.7, filed Feb. 15, 2002. This continuation application claims the benefit of priority of PCT/GB02/03180, Great Britain Application No. 0117500.9, and Great Britain Application No. 0203711.7, and incorporates herein by reference the subject matter of those applications.

FIELD OF THE INVENTION

The present invention relates to clay mineral products and their use in rubber compositions. In particular, the invention is concerned with kaolin clay products and their use in improved rubber compositions and products incorporating such compositions, for example tyre treads. The term "rubber" is used herein to refer generally to any elastomer.

BACKGROUND OF THE INVENTION

It is known that rubber compositions, such as, typically, tyre tread rubber compositions, comprise particulate reinforcing fillers. Common reinforcing fillers include carbon black and silica; other known fillers include, for example, clays, calcium carbonates, cellulose fibres and starch. Carbon black and silica are generally used in relatively large amounts in rubber compositions to impart a desirable level of reinforcement to the rubber.

In recent years, silica has become the filler of choice for tyre tread compositions (see, for example, Okel, T. A. et al, "Advances in Precipitated Silicas for Passenger and Truck Tyre Treads", Progress in Rubber and Plastics Technology, Vol. 15, No. 1, 1999, the disclosure of which is incorporated herein by reference). Many conventional tyre tread compositions now incorporate silica, either as a sole reinforcing filler or as a main filler mixed with smaller amounts of one or more other fillers. The silica is generally present in a relatively high amount, typically up to 150 parts by weight based on 100 parts by weight of the rubber.

However, silica-filled rubber tyre tread compositions suffer from certain substantial disadvantages. Precipitated silica is expensive in comparison with carbon black, and causes difficulties in processing and manufacture of rubber compositions incorporating it. A precipitated silica filler requires complicated high temperature processing when formulating the rubber composition. There can be a tendency for components of the curing system of the rubber composition and/or organic non-rubber impurities of the rubber to adsorb onto the silica particles, leading to a reduction in the cross-link density below theoretically achievable values, and poor dispersion of the filler into the rubber compositions, which in turn can lead to undesirable properties of the tyre tread product.

Silica fillers give rubbers which generally exhibit a reduced rolling road resistance (i.e. a reduced tendency for kinetic energy of the vehicle to be lost as work of deformation of the tyre) in comparison with rubbers incorporating other filler systems. On the other hand, unless an expensive coupling agent such as an organosilane is also present, this desirable reduction in rolling resistance is typically accompanied by an undesirable reduction in wet traction and/or in resistance to abrasion.

Moreover, it is found in practice that the organosilane cannot effectively be pre-coated onto the silica particles, but must generally be handled separately and included into the mix at the time of compounding the rubber composition. The manufacture and transportation of the organosilane involves an appreciable energy cost. In terms of overall "greenness" or energy efficiency, the gains of reduced fuel consumption and enhanced tyre life and performance found with silica-filled tyre treads are offset by substantial energy costs of this type.

Natural rubber is a convenient material for tread portions of radial truck tyres, in view of its excellent uncured strength and tackiness and reduced tendency to cut and chip, in comparison with synthetic rubbers. However, it has been reported that silica—even with a bonding agent present—is not compatible with natural rubber, due in part to the adsorption of organics such as proteins and fatty acids from the natural rubber onto the surface of the silica particles, leading to problems of poor abrasion resistance. Attempts to increase the proportion of organosilane bonding agent result in a reduction in the tear resistance of the rubber composition (see, for example Freund, B., Eur. Rubber J. 180(8), p. 34, 1998, the disclosure of which is incorporated herein by reference).

It is desirable to be able to use a lower amount of silica in rubber compositions without a corresponding reduction in reinforcement of the rubber and without any loss of rubber properties.

Carbon black has long been known as a particulate filler for tyre rubber compositions. However, it generally cannot be used in applications where the rubber composition needs to be pigmented. In addition, the carbon black must have a very fine particle size, leading to increased financial and energy costs in the manufacture. Carbon black can also cause an undesirable build-up of frictional heat in a tyre tread rubber composition.

Investigations have been conducted into multi-phase particulate fillers, which seek to achieve a balance of parameters which a single filler material alone cannot achieve.

For example, apparently encouraging results have been reported for the use of carbon-silica dual phase fillers (CS-DPF) in natural rubber treads for truck tyres, potentially reducing the amount of the organosilane bonding agent required (see, for example, Wang, M-J et al, "Carbon-Silica Dual Phase Filler, A New Generation Reinforcing Agent for Rubber: Application to Truck Tire Tread Compound" in Rubber Chemistry and Technology, Vol. 74, 2001, pp. 124-137, the disclosure of which is incorporated herein by reference).

There has been a general appreciation that at least partial replacement of particulate silica and/or carbon black by particulate kaolin can offer advantages in the manufacture of tyre tread rubber compositions (see, for example, U.S. Pat. No. 5,591,794, U.S. Pat. No. 5,840,795, and U.S. Pat. No. 5,871,846; EP-A-0170606, EP-A-0655480, EP-A-0678549, EP-A-0732362, and EP-A-0894819; as well as the publications cited therein and in the results of the relevant official searches). GB-A-2067535 describes the use of particulate kaolins to partially replace carbon black in tyre carcase rubber compositions. The disclosures of all these documents and prior publications are incorporated herein by reference.

However, there are substantial practical difficulties in the use of particulate kaolin as a filler for rubber compositions, and no proposal has been completely satisfactory for modern requirements. Particular difficulties are encountered with rubber compositions for tyre treads, which generally require a particular balance of properties such as a low rolling road resistance, a high degree of abrasion resistance and wet traction, and a high tensile strength and modulus of elongation. Conventional particulate kaolin tends to impair the properties of the rubber compositions and the performance of the tyres, in comparison with compositions filled with precipitated silica and/or carbon black in the absence of particulate kaolin, and generally the sought-after reduction in the required amount of the coupling agent has not been achievable.

There is therefore a need for a particulate kaolin suitable for use as a filler for rubber compositions, for example tyre tread rubber compositions, which can at least partially replace silica and/or carbon black while maintaining acceptable physical properties of the rubber compositions and acceptable performance characteristics of the tyres.

The present invention seeks to go at least some way towards answering this need, or at least to provide an acceptable alternative.

We have now developed an improved kaolin clay product which, when used as a filler or extender material in a rubber composition, provides a composition having an improved ease of manufacture and enhanced properties.

BRIEF DESCRIPTION OF THE INVENTION

According to a first aspect of the present invention, there is provided a rubber composition comprising rubber and a particulate kaolin clay having a particle size distribution such that at least about 95% by volume of the particles have a particle diameter less than 3 µm. The rubber composition may be cured or uncured.

According to a second aspect of the present invention, there is provided a production process for the said rubber composition, comprising a step of blending a rubber and a particulate kaolin clay having a particle size distribution such that at least about 95% by volume of the particles have a particle diameter less than 3 µm.

According to a third aspect of the present invention, there is provided a tyre tread formed from a cured rubber composition comprising the rubber composition according to the first aspect of the invention and a curing system, the cured rubber composition being the cured product of reaction of the rubber with the curing system.

Certain particulate calcined kaolins have not hitherto been proposed as fillers for tyre tread rubber compositions, whether in the particle size distribution defined above or in any other particle size distribution: According to a fourth aspect of the present invention, there is provided a tyre tread formed from a cured rubber composition comprising a rubber, a filler and a curing system, the cured rubber composition being the cured product of reaction of the rubber with the curing system and the filler comprising a particulate calcined kaolin selected from the following: a particulate soak calcined kaolin; a particulate flash calcined kaolin; and any combination thereof The particulate calcined kaolin may suitably, but not essentially, have a particle size distribution such that at least about 95% by vohime of the particles have a particle diameter less than 3 µm. The filler may further include a hydrous particulate kaolin clay.

According to a fifth aspect of the present invention, there is provided a rubber tyre comprising a tyre tread according to the third or fourth aspect of the invention. The tyre may, for example, be a radial-ply tyre, a cross-ply tyre, or a bias-ply tyre. The tyre may, for example, be for passenger vehicles (including cars) or trucks.

According to a sixth aspect of the present invention, there is provided the use of a particulate kaolin clay which:
 (i) has a particle size distribution such that at least about 95% by volume of the particles have a particle diameter less than 3 µm, and/or
 (ii) is selected from a particulate soak calcined kaolin, a particulate flash calcined kaolin, and any mixture thereof;
as a filler, optionally in combination with silica and/or carbon black and/or other particulate filler, in a truck or passenger tyre tread rubber composition.

Certain particulate kaolin clays useful as fillers in rubber compositions, in accordance with the present invention, are novel and such products constitute a further aspect of the present invention. According to a seventh aspect of the present invention, there is provided a particulate kaolin clay for use in a rubber composition, the kaolin clay having a particle size distribution such that at least about 95% by volume of the particles have a particle diameter less than 3 µm and at least about 90% by volume of the particles have a particle diameter less than 2 µm.

The particles of the hydrous and calcined kaolins used in accordance with the present invention may be coated with an adherent coupling agent.

The term "particle diameter" used herein refers to a particle size measurement as determined by laser light particle size analysis using a CILAS (Compagnie Industrielle des Lasers) 1064 instrument. In this technique, the size of particles in powders, suspensions and emulsions may be measured using the diffraction of a laser beam, based on application of the Fraunhofer theory. The term "mean particle size" or "$d_{50}$" used herein is the value, determined in this way, of the particle diameter at which there are 50% by volume of the particles which have a diameter less than the $d_{50}$ value. The preferred sample formulation for measurement of particle sizes using the CILAS 1064 instrument is a suspension in a liquid. The CILAS 1064 instrument normally provides particle size data to two decimal places, to be rounded up or down when determining whether the requirements of the present invention are fulfilled.

DETAILED DESCRIPTION OF THE INVENTION

Particulate Kaolin Clay

Where the particulate kaolin clay usable as a filler for rubber compositions in accordance with the present invention has a particle size distribution such that at least about 95% by volume of the particles have a particle diameter less than 3 µm, the particle size distribution preferably has a steep slope at the upper end of the distribution. In this event, it is preferred, although not essential, that no significant tail will extend above a particle diameter of 5 µm. A typical particulate kaolin clay usable in the present invention will have a particle size distribution such that between about 95% and about 99% by volume of the particles have a particle diameter less than 3 µm.

Between about 90% and about 98% by volume of the particles will suitably have a particle diameter less than 2 µm. More preferably, at least about 92% by volume of the particles will have a particle diameter less than 2 µm. More preferably still, at least about 93%, e.g. at least 93.5%, at least 94.0%, at least 94.5%, at least 95.0%, at least 95.2%, at least 95.5%, at least 95.7%, at least 96.0%, at least 96.2% or at least 96.5% by volume of the particles have a particle diameter less than 2 µm. The maximum percentage of particles having a particle diameter less than 2 µm is typically about 97% by volume.

It is preferred that less than about 1% by volume of the particles have a particle diameter between 3 and 5 µm and that less than about 40%, more preferably less than about 30%, e.g. less than 29.0%, less than 28.0%, less than 27.0%, less than 26.0% or less than 25.7%, by volume of the particles have a particle diameter between 1 and 5 µm. The majority of the volume of the kaolin clay filler is thus preferably represented by particles having a particle diameter below 1 μm. The minimum percentage of particles having a particle diameter between 1 and 5 μm is typically about 20% by volume.

It is also preferred that more than about 55%, more preferably more than 57%, e.g. more than 57.5%, more than 58.0%, more than 58.5%, more than 59.0%, more than 59.5% or more than 60.0%, by volume of the particles have a particle diameter less than 0.7 μm. The maximum, percentage of particles having a particle diameter less than 0.7 μm is typically about 63% by volume.

It is also preferred that more than about 30% by weight, more preferably more than about 40%, e.g. more than 41.0%, more than 42.0%, more than 43.0%, more than 44.0%, more than 45.0% or more than 46.0%, by volume, of the particles have a particle diameter less than 0.5 μm. The maximum percentage of particles having a particle diameter less than 0.5 μm is typically about 50% by volume.

The particles of the particulate kaolin clay preferably include at least about 7%, more preferably at least 10%, by volume of particles having a particle diameter less than 0.2 μm and at least about 4% by volume of particles having a particle diameter less than 0.1 μm. The maximum percentage of particles having a particle diameter less than 0.2 μm is typically about 20% by volume. The maximum percentage of particles having a particle diameter less than 0.1 μm is typically about 10% by volume.

In one particular embodiment of the present invention which may be mentioned, the particulate kaolin clay may consist essentially of a population of particles in which about 90% by volume of particles have a particle diameter less than 2 μm, about 60% by volume of particles have a particle diameter less than 1 μm, about 30% by volume of partic&s have a particle diameter less than 0.5 μm, and about 7% by volume of particles have a particle diameter less than 0.2 μm.

In another particular embodiment of the present invention which may be mentioned, the particulate kaolin clay may consist essentially of a population of particles in which about 95% by volume of particles have a particle diameter less than 2 μm, about 70% by volume of particles have a particle diameter less than 1 μm, about 30% by volume of particles have a particle diameter less than 0.5 μm, and about 7% by volume of particles have a particle diameter less than 0.2 μm.

As indicated above, the particulate soak and flash calcined kaolin clays, usable as fillers for rubber compositions in accordance with the present invention, may alternatively have any other appropriate particle size distribution. In particular, a higher proportion of large particles may be present.

Further particular embodiments are shown in Tables 1 and 2 below, showing nine typical, but non-limiting, particle size distributions of particulate kaolin clays usable in the present invention (Note: 4 is a flash calcined clay, and 5 is a soak calcined clay).

TABLE 1

| Particle | % finer than given diameter | | | | |
|---|---|---|---|---|---|
| diameter μm | 1 | 2 | 3 | 4 | 5 |
| 5 | 100 | 100 | 100 | 92.4 | 78.8 |
| 3 | 99.4 | 97.6 | 99.4 | 83.7 | 67.2 |
| 2 | 95.4 | 91.5 | 94.5 | 68.4 | 57.2 |
| 1 | 76.5 | 63.8 | 66.1 | 32.4 | 31.7 |
| 0.7 | 61.9 | 43.3 | 45.9 | 16.3 | 17.7 |
| 0.5 | 47.1 | 27.8 | 30.2 | 8.7 | 10.4 |
| 0.2 | 18.1 | 6.9 | 8.2 | 1.9 | 2.7 |
| 0.1 | 7.9 | 2.3 | 2.8 | 0.54 | 0.58 |

TABLE 2

| Particle | % finer than given diameter | | | |
|---|---|---|---|---|
| diameter μm | 6 | 7 | 8 | 9 |
| 5 | 100 | 100 | 100 | 100 |
| 3 | 99.7 | 99.7 | 99.3 | 99.7 |
| 2 | 96.2 | 96.5 | 94.9 | 96.5 |
| 1 | 74.5 | 76.5 | 74.4 | 76.8 |
| 0.7 | 57.4 | 60.6 | 59.3 | 60.6 |
| 0.5 | 41.7 | 45.3 | 44.9 | 45.3 |
| 0.2 | 14.3 | 17.0 | 17.4 | 17.0 |
| 0.1 | 5.8 | 7.5 | 7.8 | 7.5 |

The $d_{50}$ of the particulate kaolin clay usable in the present invention will typically lie in the range of from 0.3 μm to 2.0 μm, e.g. about 0.5 to about 1.0 μm, for example about 0.7 μm.

The particles of the particulate kaolin clay usable in the present invention may be hydrous or anhydrous (calcined), or a mixture of hydrous and anhydrous. Hydrous kaolin represents the natural form of the mineral, and typically has a specific gravity of about 2.6. Anhydrous kaolin is prepared by heat-treating (calcining) the hydrous material, which serves to remove hydroxyl groups from the molecular structure (dehydroxylation). The density of anhydrous (calcined) kaolin depends on the calcination conditions used. Typically, calcined kaolin will have a specific gravity in the range of about 2.2 to about 2.6, more preferably about 2.4 to about 2.6.

The calcination process typically causes significant modification of the crystal structure of the kaolin, leading to modification of the characteristics of the material. In particular, when a hydrous kaolin is calcined to about 500-600° C., an endothermic reaction occurs. Essentially all of the water associated with the uncalcined kaolin crystals is eliminated and an essentially amorphous (as measured by x-ray diffraction) material called metakaolin results. If the kaolin is heated to higher temperatures, further significant changes occur. The metakaolin undergoes an exothermic reaction (which typically occurs at about 900-980° C.). Such a material is then referred to as a "fully calcined kaolin". Particulate kaolin which has been produced from crude natural kaolins has typically been subjected to beneficiation (such as, for example, froth flotation, magnetic separation, mechanical delamination, or grinding or other comminution), and although possibly not "hydrous" in a strict sense, such particulate materials are conventionally referred to as "hydrous kaolin" provided that they have not been heated to temperatures above about 450° C. This conventional terminology will be adhered to in the following description.

The expression "kaolin clay" is used herein simply for convenience, to cover both hydrous and anhydrous forms, and should not be read as implying one form in preference to the other, or as implying that the degree of clay-like behaviour is a limiting feature of the invention.

The expression "kaolin clay" used herein therefore refers to all forms of kaolin, with "hydrous kaolin" and "calcined kaolin" being specific to the respective different forms.

The particles of the kaolin clay usable in the present invention preferably have a specific surface area (as measured by the BET liquid nitrogen absorption method ISO 5794/1) of at least about 5 $m^2.g^{-1}$, e.g. at least about 15 $m^2.g^{-1}$, at least about 20 $m^2.g^{-1}$ or at least about 25 $m^2.g^{-1}$, and generally about 15-40 $m^2.g^{-1}$.

The particle size distribution shown in Table 1 above is generally representative of hydrous kaolins usable in the present invention, although is not limited to hydrous kaolins. The particle size distributions shown in Table 2 above are generally representative of calcined kaolins usable in the present invention, although are not limited to calcined kaolins.

The calcined kaolin usable in the present invention may, for example, be prepared by a soak calcination process or by a flash calcination process, conducted on particles of hydrous kaolin.

Soak calcination refers to heating a material at a relatively gentle rate, e.g. to a temperature greater than about 500° C. for a time in excess of 5 seconds, usually for several (e.g. about 30 to 45) minutes, and sometimes more than 1 hour. A relatively low temperature may be used e.g. about 800° C., resulting in metakaolin, or a higher temperature, e.g. in the range of from 900° C. to 1200° C., for example about 1050° C. to about 1150° C., resulting in fully calcined kaolin.

Flash calcination refers to heating a material at an extremely fast rate, almost instantaneously, e.g. by exposure to a temperature greater than about 500° C. for a time not more than 5 seconds. The temperature is suitably in the range of from 550° C. to 1200° C. For example, a temperature of about 800° C. may be used, resulting in metakaolin, or a higher temperature such as a temperature in the range of from 800° C. to 1200° C. (e.g. from 800° C. to 1100° C., from 900° C. to 1100° C., from 900° C. to 1050° C., or from 950° C. to 1000° C.), resulting in metakoalin or fully calcined kaolin.

Flash calcination of the hydrous kaolin particles (e.g. for less than about 1 second, for less than 0.5 second or for less than 0.1 second) gives rise to relatively rapid blistering of the particles caused by relatively rapid dehydroxylation of the kaolin. Water vapour is generated during calcination, which may expand extremely rapidly, in fact generally faster than the water vapour can diffuse through the crystal structure of the particles. The pressures generated are sufficient to produce sealed voids as the interlayer hydroxyl groups are driven off, and it is the swollen interlayer spaces, voids, or blisters between the kaolin platelets which typify flash calcined kaolins and give them characteristic properties. The flash calcination process may be carried out by injecting the kaolin clay into a combustion chamber or furnace wherein a vortex is established to rapidly remove the calcined clay from the combustion chamber. A suitable furnace would be one in which a toroidal fluid flow heating zone is established.

In one particular method for preparing the hydrous kaolin, a raw particulate hydrous kaolin is comminuted to the desired fineness and particle size distribution. A typical particle size distribution of the final product is shown in Table 1 above. Comminution is preferably achieved by use of conventional processing techniques such as milling (e g. dry ball milling or fluid energy milling), centrifigation, particle size classification, filtration, drying and the like.

In one particular method for preparing the calcined kaolin, a commercially available fine calcined particulate kaolin (which may, for example, have a particle size distribution such that about 79% by volume of the particles have a particle diameter less than 5 μm and/or about 57% by volume of the particles have a particle diameter less than 2 μm) is comminuted to the desired fineness and particle size distribution. Such a particulate calcined kaolin starting material may, for example be the fines recovered from the hot exhaust gases which exit the calciner during the normal calcining process. Examples of such fines are described in U.S. Pat. No. 5,713,998 and the publications referred to therein, the disclosures of which are incorporated herein by reference. Comminution is preferably achieved by use of conventional processing techniques such as sand grinding (e.g. wet sand grinding in suspension), milling (e.g. dry ball milling or fluid energy milling), centrifigation, particle size classification, filtration, drying and the like. Wet sand grinding is preferred, in which case the desired particle size reduction (e.g. to the particle size distribution shown in column 6 or 9 of Table 2 above) is typically achieved after a work input of about 110 kilowatt-hours per tonne, and the kaolin is then preferably filtered, dried at 80° C. and milled to provide the final product.

In another particular method for preparing the calcined kaolin, a hydrous kaolin according to the present invention is calcined, with any necessary subsequent comminution to maintain the desired particle size distribution of the calcined product.

For example, the hydrous kaolin may be the hydrous kaolin mentioned above (having the particle size distribution shown in column 1 of Table 1 above) may be soak calcined by being heated to 1080° C. for an extended period (e.g. about one hour), cooled and then wet sand ground. The desired particle size reduction (e.g. to the particle size distribution shown in column 7 of Table 2 above) is typically achieved after a work input of about 240 kilowatt-hours per tonne. The kaolin is then filtered at 53 μm, pressed and dried, and milled to provide the final product.

In another example, the hydrous kaolin may be flash calcined by being heated rapidly for a short period (e.g. about one second), cooled and then wet sand ground, filtered, dried and milled in generally the same way as in the first example above. An example of the resultant particle size distribution is shown in column 8 of Table 2 above.

The flash calcined kaolin according to the present invention typically has a specific gravity lower than hydrous kaolin, and sometimes also lower that soak calcined kaolin, such as, for example, equal to or less than 2.4, and desirably equal to or less than 2.2. It is generally desirable, although not essential, for the particulate kaolin according to the present invention to have a specific gravity as close as possible to that of any other filler components) that may be present (precipitated silica typically has a specific gravity of about 2.0-2.2, and tread-grade carbon black typically has a specific gravity of about 1.8).

The use of relatively low density flash calcined kaolin as a filler or extender material in a rubber composition can be particularly beneficial, because a relatively low specific gravity means that more of the flash calcined kaolin may be employed in the composition if desired, without increasing the weight of the rubber. Furthermore, and unexpectedly, the calcined kaolin, prepared by soak calcination or flash calcination at a high temperature, that is typically in the range of from about 900° C. to about 1200° C., may maintain a high surface area greater than about 20 $m^2.g^{-1}$, for example equal to or greater than 25 $m^2.g^{-1}$ and in some cases at least 30 $m^2.g^{-1}$ (as measured by the BET liquid nitrogen absorption method ISO 5794/1).

In a further particular method for preparing the calcined kaolin, a commercially available coarse particulate calcined kaolin is very intensively comminuted (e.g. milled) to provide the final product.

The particulate kaolin clay is typically present in an amount of from about 5 parts to about 50 parts by weight, based on 100 parts by weight of the rubber. In accordance with conventional terminology in the rubber industry, the expression "parts by weight, based on 100 parts by weight of the rubber" will be abbreviated herein to "phr". It should, however, be noted that in rubber compositions comprising a mixture of different rubbers, it is conventional, although not universal, to base the "phr" amounts on the predominant rubber of the mixture. The term "phr" used herein can be based either on the predominant rubber of a mixture, or on the total rubber content of the mixture, to allow for both potential usages of the term in the art.

The particulate kaolin clay may, for example, be present in the rubber composition in amounts ranging between about 5 and about 80 phr, more preferably between about 10 and about 60 phr, e.g. between about 15 and about 45 phr.

Rubber

The rubber may be a natural rubber, or a synthetic rubber, or a mixture of natural and synthetic rubbers. Sulphur-vulcanisable rubbers are preferred for the manufacture of tyre treads. Examples of synthetic rubbers which may be employed in tyre treads are styrene-butadiene rubber (SBR), vinyl-styrene-butadiene rubber (VSBR), butadiene rubber (BR), neoprene rubber or polyisoprene. An example of a natural rubber is Standard Malaysian natural rubber. SBR may be emulsion SBR (E-SBR) or solution SBR (S-SBR). VSBR may suitably be solution VSBR (S-VSBR). Examples of BR include cis-1,3-polybutadiene rubber and cis-1,4-polybutadiene rubber. Mixtures of any of these rubbers, or mixtures with other rubbers, may also be used.

The rubber may include conventional additives such as, for example, one or more extender oil.

The selection of appropriate types and grades of rubber for tyre tread or other applications will be within the capacity of one of ordinary skill in this art, and further discussion is not required.

Rubber Composition—Other Components

As will readily be understood by one of ordinary skill in this art, the rubber composition may typically be compounded with other components known in the rubber compounding art, such as, for example, curing aids, processing additives such as lubricants, oils, resins (including tackifying resins) and plasticisers, other fillers, pigments and peptising agents. The rubber composition preferably comprises further components selected from one or more of one or more additional particulate filler;
one or more coupling agent;
one or more process oil;
one or more antioxidant and/or anti-degradant;
one or more lubricant (release aid);
a curing system for the rubber; and
one or more activator for the curing system.

The curing system is an essential part of any cured or curable rubber composition according to the present invention.

The rubber composition most preferably consists essentially of the rubber component(s), the particulate filler component(s), the coupling agent component(s), the process oil component(s), the antioxidant and/or anti-degradant component(s), the lubricant component(s), and the curing system and activator therefor, with less than about 5 phr of other components.

Additional Particulate Filler

It is preferred that one or more additional particulate filler will be present in the rubber composition. The additional particulate filler component(s), when present, may, for example, be selected from particulate silica, carbon black, or both. Appropriate grades of such filler will be used for tyre treads. High-structure, high surface area silica and/or high-structure carbon black are preferred as additional particulate fillers.

The silica is preferably a precipitated silica such as the mechanically granulated precipitated silica Ultrasil 7000 GR™ (available from Degussa Corporation, Akron, Ohio, USA; tel: +1 330 665 1231). Such a silica typically has a specific surface area (as measured by the BET liquid nitrogen absorption method ISO 5794/1) of about 175 $m^2 g^{-1}$, a pH value of about 6.8 (as measured by DIN ISO test method 787/9) and a silicon dioxide content of greater than or equal to about 97% (as measured by ISO test method 3262/17).

The carbon black is preferably a tread-grade carbon black such as Corax N220™ (available from Degussa-Hüls AG, Germany; tel: +49 6181 594787; web-site: www.degussa-huels.de). Such a carbon black typically has an iodine absorption (as measured by ASTM test method D 1510) of about 121 mg/g, a surface area (as measured by cetyltrimethylammonium bromide (CTAB) absorption under ASTM test method D 3765) of about 111 $m^2 g^{-1}$, and a sieve residue (35 mesh)(as measured by ASTM test method D 1514) of about 300 ppm max.

The particulate silica, when present, is typically in an amount of between about 40 and about 150 phr. The carbon black, when present without silica, is typically in an amount of between about 10 and about 80 phr. The carbon black, when present with silica, is in an amount between about 1 and about 45 phr. The additional particulate filler component(s) may suitably be present in the rubber composition in a total amount between about 20 and about 170 phr. It is preferred that the amount of any conventional additional particulate filler component(s) present is such that the kaolin clay can be considered as having substituted, on a 1:1 weight basis, from about 10% to about 80% by weight of the conventional amount of the additional particulate filler that would be employed for the desired rubber composition. In the case of silica as the primary additional filler, it is preferred that the kaolin clay will substitute about 20% to about 80% by weight of the conventional amount of the silica in a silica-filled tyre tread rubber composition. In the case of carbon black as the primary additional filler, it is preferred that the kaolin clay will substitute about 20% to about 80% by weight of the conventional amount of the carbon black in a carbon-filled tyre tread rubber composition.

For example, the kaolin clay may replace up to 60 parts by weight of silica based on 100 parts by weight of the rubber, e.g. from 5 parts to 50 parts by weight of silica based on 100 parts by weight of the rubber, e.g. from 5 parts to 30 parts by weight of silica based on 100 parts by weight of the rubber (phr). The partial substitution of an amount of silica in a rubber composition by a kaolin clay, enabled by the present invention, can unexpectedly preserve the reinforcement level of the rubber and enhance key performance properties of the rubber, and of products incorporating the rubber. Furthermore, it is found that the kaolin clay does not exhibit a dependency on a coupling agent to the degree exhibited by a silica filler, so that the substitution of some or all of the silica by the kaolin reduces the amount of the coupling agent required.

The use of kaolin clay according to the present invention also avoids the need for—and therefore the rubber composition may exclude—certain known components of filler materials in rubber compositions, particularly but not exclusively any of: methylene donor/acceptor pairs (U.S. Pat. No. 5,840, 795); a rubber powder which is the product of vulcanisation of a rubber composition containing natural rubber, polyisoprene and/or polybutadiene and 30 to 100 phr of a clay mainly composed of koalinite (EP-A-0678549); alumina or aluminium hydroxide (WO-A-99/28376); organic short fibres (EP-A-0719820), cellulose fibres and/or wood fibres and/or hollow ceramic particles (U.S. Pat. No. 5,967,211); cellulose-containing powders (EP-A-0942041); a starch/plasticiser composite (U.S. Pat. No. 5,672,639); an inorganic salt (EP-A-0890602); sodium borate (EP-A-0943648); calcium carbonate (EP-A-0933391); and a C9-aromatic petroleum resin and/or an alkylphenol resin (EP-A-0697432).

Coupling Agent

It is preferred, particularly when silica is present as an additional filler component of the rubber composition, that one or more coupling agent will be present in the rubber composition. The coupling agent component(s), when present, may be selected from organosilane coupling agents. Examples of suitable organosilane coupling agents include compounds of formula I:

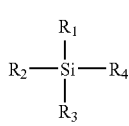

(I)

wherein $R_1$ is an aminoalkyl or mercaptoalkyl group, $R_2$ is a hydroxy, hydroxyalkyl or alkoxy group, and each of $R_3$ and $R_4$, which may be the same or different, is a hydrogen atom or a hydroxy, alkyl, hydroxyalkyl or alkoxy group. Each of $R_2$, $R_3$ and $R_4$ may, for example, be a hydroxy, hydroxyalkyl or alkoxy group, and each of $R_1$, $R_2$, $R_3$ and $R_4$ may, for example, contain not more than 4 carbon atoms. In one example, $R_1$ may be a γ-mercaptopropyl group and each of $R_2$, $R_3$ and $R_4$ may be a methoxy group.

An alternative representation of examples of suitable organosilane coupling agents, which to some extent overlaps with formula I, is given by the following formula II:

$$(R_1O)_2R'—Si—X \qquad (II)$$

wherein R' represents a $C_{1-4}$ alkyl (e.g. methyl or ethyl) group, $R_1$ represents a methyl or ethyl group and X represents a mercaptopropyl group, a vinyl group or a thiocyanatopropyl group.

Still further examples of suitable organosilane coupling agents include compounds of formula III:

$$(RO)_3—Si—(CH_2)_m—S_k—(CH_2)_m—Si(OR)_3 \qquad (III)$$

wherein R represents a $C_{1-4}$ alkyl (e.g. methyl or ethyl) group and m and k are each independently selected from the integers 1, 2, 3, 4, 5 and 6 (e.g. m=3 and k=4).

Still further examples of suitable organosilane coupling agents include compounds of formula IV:

$$X_3SiR \qquad (IV)$$

wherein X represents a $C_{1-4}$ alkoxy (e.g. methoxy or ethoxy) group or a chlorine atom, and R represents a glycidoxy, methacryl, amino, mercapto, epoxy or imide group.

Further examples of organosilane coupling agents are given in the prior art acknowledged above, as well as the publications cited therein and in the results of the relevant official searches, and are to be considered as incorporated herein by reference.

The organosilane coupling agent is preferably bis-(3-triethoxysilylpropyl)-tetrasulphide, i.e. a compound of formula III in which R is ethyl; m=3 and k=4, such as is commercially available under the name Si69™ from Degussa. An alternative organosilane coupling agent is γ-mercaptopropyl trimethoxy silane, such as is commercially available under the name A189 from Osi-Crompton (web-site: www.osispecialities.com).

The organosilane coupling agent component(s) may suitably be present in the rubber composition in an amount up to about 20% by weight of the total of kaolin and any additional filler, preferably between about 1 and about 15% by weight.

The organosilane coupling agent component(s) can be added directly into the composition mixture during blending (compounding) of the rubber composition, or at least a portion of the organosilane coupling agent component(s) may be used to pre-treat the particulate kaolin clay filler and/or some or all of any additional particulate filler component(s) prior to addition of the filler component(s) to the composition mixture, the organosilane adhering to the filler particles. Preferably, the organosilane will be present in an amount up to about 20% by weight of the kaolin particles, more preferably from about 1% to about 15% by weight. For further details, see the section below headed "Preparation of the Rubber Compositions".

The use of kaolin clay according to the present invention avoids the need for—and therefore the rubber composition may exclude—complex multi-component organosilane bonding systems such as surfactant and sulphur/vinyl-functional silane combinations (U.S. Pat. No. 5,871,846).

Process Oil

It is preferred that one or more process oil will be present in the rubber composition. The process oil component(s), when present, may be selected from one or more dewaxed highly refined rubber process oils. Such oils may be predominantly aromatic, or may have a predominance of saturated rings and long paraffinic side chains. The aromatic oils typically have a low aniline point, e.g. below about 25° C. The paraffinic oils typically have a high aniline point, e.g. above about 95° C.

The aromatic process oil component(s) may be selected from rubber process oils such as Sundex™ oils, e.g. Sundex 790 (available from Sun Oil Company; web-site: www.sunco.be). Such a process oil typically has a density (15° C.) of about 1.01 g/cm³, a viscosity (40° C.) of about 840 cSt, a viscosity (100° C.) of about 21 cSt, a flash-point (OCC) of about 245° C. and a pour point of about 6° C.

The paraffinic process oil component(s) may be selected from rubber process oils such as Sunpar™ oils, e.g. Sunpar 2280 (available from Sun Oil Company; web-site: www.sunco.be). Such a process oil typically has a density (15° C.) of about 0.9 g/cm³, a viscosity (40° C.) of about 475 cSt, a viscosity (100° C.) of about 31 cSt, a flash-point (COC) of about 305° C. and a pour point of about −9° C.

The process oil component(s) may suitably be present in the rubber composition in an amount between about 1 and about 10 phr, preferably between about 2 and about 8 phr.

Antioxidant/Anti-Degradant

It is preferred that one or more antioxidant and/or anti-degradant will be present in the rubber composition. The antioxidant and/or anti-degradant component(s), when present, may be selected from one or more aromatic organic radical- and/or ozone-scavenging compounds, such as polymerised quinoline derivatives, PPD (paraphenylenediamine) derivatives and diphenylamine derivatives. The antioxidant/anti-degradant is preferably a PPD antiozonant such as Santoflex IPPD™ (N-isopropyl-N'-phenyl-p-phenylenediamine) or Santoflex 6PPD™ (N-(1,3-dimethylbutyl)-N'-phenyl-p-phenylenediamine) (available from Flexsys, Akron, Ohio, USA; tel: +1 330 666 4111) or Wingstay 100AZ™ (a mixture of diaryl-p-phenylenediamines) (available from Goodyear Chemical, Akron, Ohio, USA; tel: +1 330 796 2230; web-site: www.goodyearchemical.com), or a polymerised quinoline derivative such as Flectol TMQ™ (2,2,4-trimethyl-1,2-dihydroquinoline) (also available from Flexsys).

The antioxidant/anti-degradant component(s) may suitably be present in the rubber composition in an amount between about 0.5 and about 4 phr, preferably between about 1 and about 3 phr.

Lubricant

It is preferred that one or more lubricant will be present in the rubber composition. The lubricant component(s), when present, may be selected from one or more lubricant wax, e.g. a paraffin wax, a micro-crystalline wax, or both. Appropriate grades of lubricant wax will be used for tyre treads.

The lubricant is preferably a tyre grade micro-crystalline wax such as SHELLMAX f:400™ (available from Equilon Enterprises LLC, tel: +1 877 276 7285; Web-site: www.shell-lubricants.com). Such a wax typically has a drop point in the range about 60 to about 93° C. (as measured by ASTM test method D 127) and a carbon chain length in the range about 19 to 46 (as measured by ASTM test method D 1160).

The lubricant component(s) may suitably be present in the rubber composition in an amount between about 0.5 and about 4 phr, preferably between about 1 and about 3 phr.

Curing System

Any suitable curing system for the rubber may be employed in the present invention. Curing of the rubber composition normally involves vulcanisation, and is effected by subjecting the uncured rubber composition to conditions of heat and pressure (see below).

The vulcanisation is achieved by means of a vulcanising agent. Examples of suitable vulcanising agents include elemental (free) sulphur or sulphur donors such as amine disulphides, polymeric polysulphides or sulphur-olefin adducts. The vulcanising agent is preferably elemental sulphur or a combination of elemental sulphur and one or more sulphur donor.

The vulcanising agent component(s) may suitably be present in the rubber composition in an amount between about 0.5 and about 5 phr, preferably between about 0.5 and about 2 phr.

An accelerator is used with a vulcanising agent to control the time required for vulcanisation and to improve the properties of the vulcanisate. A single ("primary") or multiple ("primary" and "secondary") accelerator system may be used, as will be known to one of ordinary skill in this art. The or each accelerator may suitably be present in an amount between about 0.5 and about 5 phr, preferably between about 0.5 and about 4 phr. Suitable accelerators for use in the present invention include amines, disulphides, guanidines, thioureas, thiazoles, thiurams, sulphenamides, dithiocarbamates and xanthates. Particular examples of these materials are TBzTD (tetrabenzyl thiuram disulphide), CBS (N-cyclohexyl benzothiazole sulphenamide), TBBS (N-tert.butyl-2-benzothiazole sulphenamide, for example Santocure TBBS™ (available from Flexsys)) and DPG (diphenyl guanidine).

Activator

It is preferred that one or more activator component(s) for the accelerator will be present in the rubber composition. The activator component(s), when present, may be selected from one or more saturated fatty acid such as stearic acid, palmitic acid, or both, or zinc oxide. Fatty acids may also serve as dispersing agents for the fillers. The activator component(s) may suitably be present in the rubber composition in an amount between about 3 and about 12 phr, preferably between about 5 and about 10 phr.

Preparation of the Rubber Compositions

Any suitable compounding apparatus with temperature control and a mixing device may be used to prepare the rubber compositions of the present invention. A Banbury™ rotary compounder may conveniently be used. The use of the particulate kaolin clay in accordance with the present invention generally enables lower compounding temperatures to be used, compared with temperatures required for conventional fillers, and an efficient procedure which avoids overnight cooling of the compounding mixture.

As will be well known to one of ordinary skill in this art, the compounding typically proceeds in at least two stages, namely at least one so-called non-productive stage followed by a so-called productive mix stage. The blending of the rubber and the filler typically takes place in one or more non-productive stage. The curing system is typically mixed in the final "productive" stage, usually at a lower temperature and compounder speed than the temperature(s) and speed(s) of the preceding non-productive stage(s). The higher temperatures/speeds of the non-productive stages are generally necessary to serve the particular processing needs of the rubber and other components. For example, particulate silica fillers require a particularly high processing temperature, in the region of 140-165° C., for example between about 150 and about 165° C., to ensure correct compounding into the rubber composition.

There is usually a cooling and/or cold milling interval between at least some of the stages, for which the rubber composition (masterbatch) is dumped from the compounder. The masterbatch will then be returned to the compounder for the next stage. The final masterbatch is typically dumped from the compounder and allowed to cool before use.

The organosilane coupling agent component(s) can be added directly into the composition mixture during compounding of the rubber composition, or at least a portion of the organosilane coupling agent component(s) may be used to pre-treat the particulate kaolin clay filler and/or some or all of any additional particulate filler component(s) prior to addition of the filler component(s) to the composition mixture.

For further details of typical compounding procedures, please refer to Okel et al (supra). The compounding procedure employed to prepare a rubber composition according to the present invention will depend on the nature of the composition. If silica and a silane coupling agent are present and are to react together in situ, then generally a relatively high temperature (e.g. 140-165° C.) will be required at the stage of the compounding procedure at which the silane coupling agent is to react with the silica, and a multi-stage mixing procedure will be required, to adequately disperse the silica in the composition. If it is not necessary to couple a silane coupling agent with silica during the compounding procedure, e.g. if no silica is present, then there is the potential to simplify the processing by using fewer steps, and to reduce the mixing temperature. However, there will at each part of the procedure be a minimum temperature, below which the components of the composition then present would not melt and would therefore not be adequately dispersed in the composition. For example, this minimum temperature at the dumping step may be as low as about 115° C., which would ensure melting of the sulphur vulcanising agent (melting point 112° C.) and any antioxidant with a melting point less than 115° C. (6PPD has a melting point of 95° C., for example).

The present invention makes it possible in the particular case of truck tyre compositions—where silica may be wholly or substantially absent—for the production process to be such that all blending stages are performed at temperatures no more than about 140° C. More preferably still, the total process up to the production of a masterbatch ready for curing may be performed at temperatures no more than about 130° C., no more than about 120° C. or no more than about 115° C. In the case of passenger tyre compositions where silica and a silane coupling agent are wholly or substantially absent, low processing temperatures may also be achievable using the present invention.

The present invention also makes it possible—where silica is not required to be reacted with a silane coupling agent—for the total process up to the production of a masterbatch ready for curing to be performed with only one dumping of partially completed masterbatch for cold milling.

In addition to these advantages made available by use of the particulate kaolin clay according to the present invention, we have found that the invention makes it possible for the total time taken for the non-productive blending stage(s), including any cold milling and cooling time between more than one non-productive blending stages but not including any cold milling and cooling time between non-productive and productive blending stages, to be less than about 15 minutes, more particularly less than about 10 minutes, and most particularly less than about 5 minutes.

Manufacture of the Tyre Treads and Tyres

The tyre treads and tyres according to the present invention are prepared in conventional manner, e.g. by extrusion, rolling or other suitable forming of the masterbatch into a tread band or strip (tread profile) which is then cut, glued and built onto an assembly of a cylindrical tyre carcase (including inner liner, body plies, beads and the cap ply) and sidewall belts before the whole assembly is cured by heat (typical vulcanisation temperature about 160° C.) and pressure in a press, at which pressing stage the tread pattern and sidewall lettering are also formed. Final finishing (e.g. trimming) and inspection then follow. The procedure will be well known to one of ordinary skill in this art. For a general discussion of manufacturing methods, see the "Tyres" chapter in "Anatomy of a Motor Car" (Edited by Ward, I.), published by Macdonald & Co. (Publishers) Ltd. (London).

BRIEF DESCRIPTION OF THE DRAWINGS

Embodiments of the invention will now be described, by way of example only and without limitation, with reference to the accompanying drawings, in which.

DETAILED DESCRIPTION OF THE DRAWINGS

Preparation of the Test Materials

Figure 1A:
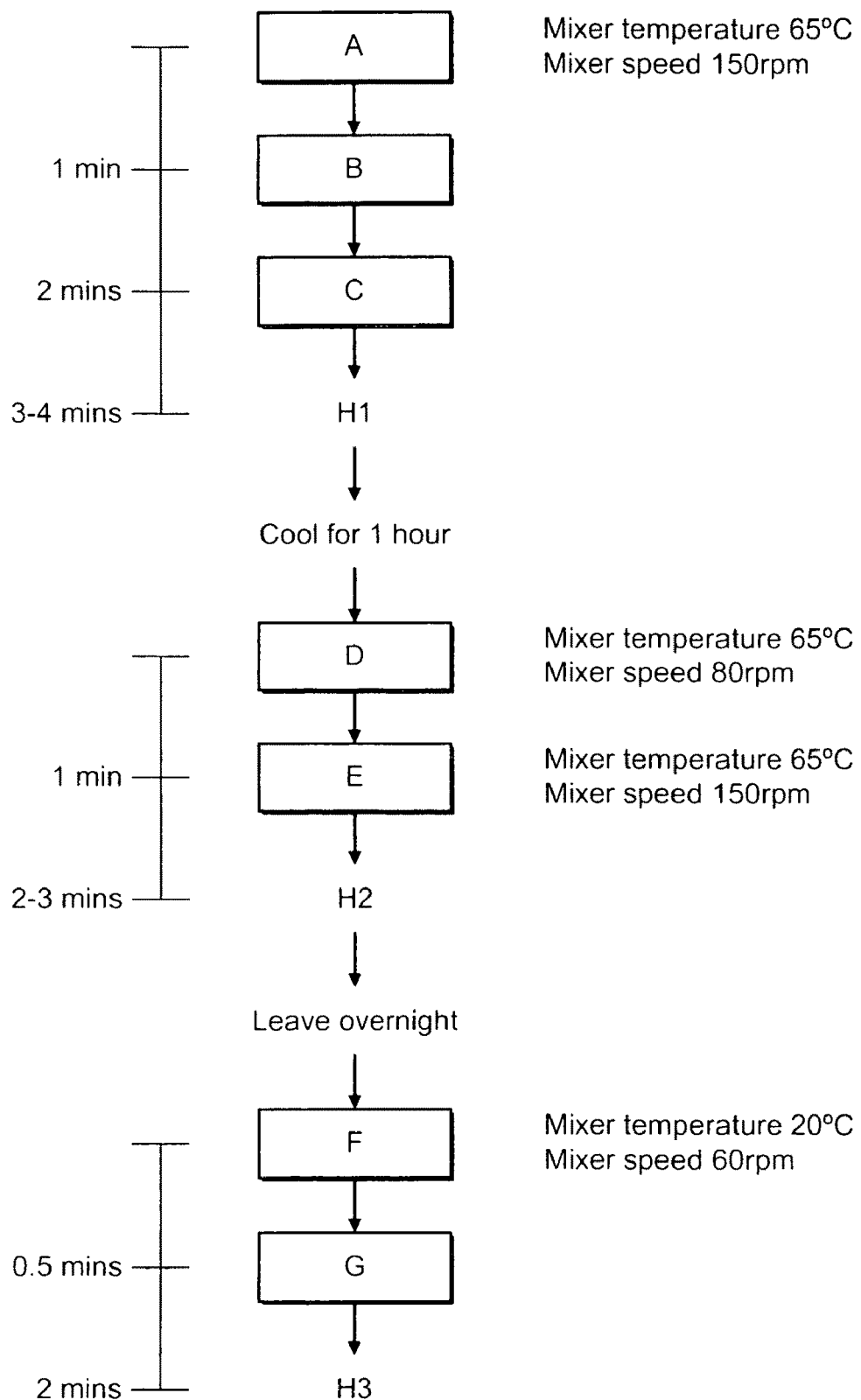
FIG. 1A is an illustration of a first embodiment of process steps for the manufacture of a tyre tread rubber composition.

Uncured Tyre Tread Rubber Compositions A to E and Control X

One coarse hydrous particulate kaolin clay K1 not in accordance with the present invention (comparison material), and five particulate kaolin clays K2 to K6 in accordance with the invention, were prepared and used as filler materials in tyre tread rubber compositions to partially replace a predetermined amount of silica (30 phr) in each composition, thereby modifying (in the case of the invention, improving) the balance of processability, rolling resistance, and wet traction properties of the tyre tread composition.

The physical properties of the clays were as shown in Table 3 below:

TABLE 3

|    | D50 (μm) | Mean Pore diameter | Pore Volume ($cm^3 g^{-1}$) | Surface area ($m^2 g^{-1}$) |
|----|----------|--------------------|-----------------------------|------------------------------|
| K1 | 1.57     | 0.48               | 0.74                        | 14.6                         |
| K2 | 0.5      | 0.48               | 0.74                        | 27                           |
| K3 | 0.75     | 0.31               | 0.83                        | 16                           |
| K4 | 1.39     | 0.25               | 0.88                        | 32                           |

TABLE 3-continued

|    | D50 (μm) | Mean Pore diameter | Pore Volume ($cm^3 g^{-1}$) | Surface area ($m^2 g^{-1}$) |
|----|----------|--------------------|-----------------------------|------------------------------|
| K5 | 1.61     | 0.31               | 0.83                        | 16                           |
| K6 | 0.56     | 0.20               | 0.60                        | 18.2                         |

K1 and K2 were hydrous clays; K3, K5 and K6 were soak calcined clays; and K4 was a flash calcined clay. K1 and K2 were prepared by sand grinding a coarse particulate hydrous kaolin. K3 clay was prepared by calcining a hydrous clay of similar particle size to K2 in a combustion chamber at a temperature of 1050° C. for 45 minutes, and then subjecting the calcined clay to sandgrinding. K5 was prepared by calcining a hydrous clay of similar particle size to K2 in a combustion chamber at a temperature of 1150° C. for 30 minutes. K4 was prepared by flash calcining K2 at a temperature of 900° C. for less than 1 second, and then subjecting the flash calcined clay to sandgrinding. K6 was prepared as per K3, but with a more intensive sandgrinding.

The hydrous clay K1 had a particle size distribution such that about 88% by volume of the particles have a particle diameter less than 5 μm, about 76% by volume of the particles have a particle diameter less than 3 μm, about 61% by volume of the particles have a particle diameter less than 2 μm, about 30% by volume of the particles have a particle diameter less than 1 μm, about 9% by volume of the particles have a particle diameter less than 0.5 μm, and about 2% by volume of the particles have a particle diameter less than 0 2 μm.

The hydrous clay K2 had the particle size distribution shown in column 2 of Table 1 above. The calcined clays K3 and K4 had the particle size distributions shown in columns 3 and 4 respectively of Table 1 above. The calcined clay K5 had the particle size distribution shown in column 5 of Table 1 above. The calcined clay K6 had the particle size distribution shown in column 9 of Table 2 above.

Six tyre tread rubber compositions were prepared, having the formulations given in Table 4 below:

TABLE 4

| Ingredient | Type | Composition (ingredients in phr) | | | | | |
|---|---|---|---|---|---|---|---|
| | | A/A' | B/B' | C/C' | D/D' | E/E' | X/X' |
| Buna VSL 5525-1 | Rubber - solution SBR (styrene-butadiene rubber) | 103 | 103 | 103 | 103 | 103 | 103 |
| Buna CB 24 | Rubber (BR) | 25 | 25 | 25 | 25 | 25 | 25 |
| Corax N220 | Carbon black reinforcing filler | 6.4 | 6.4 | 6.4 | 6.4 | 6.4 | 6.4 |
| Sunpar 280 | Process oil | 6 | 6 | 6 | 6 | 6 | 6 |
| Si69 | Silane coupling agent | 6.4 | 6.4 | 6.4 | 6.4 | 6.4 | 6.4 |
| Kaolin | K1 | 30 | | | | | — |
| | K2 | | 30 | | | | — |
| | K3 | | | 30 | | | — |
| | K4 | | | | 30 | | — |
| | K5 | | | | | 30 | — |
| Silica | Silica reinforcing agent | 50 | 50 | 50 | 50 | 50 | 80 |
| ZnO | Zinc oxide activator | 2.5 | 2.5 | 2.5 | 2.5 | 2.5 | 2.5 |
| Stearic acid | Stearic acid activator | 1 | 1 | 1 | 1 | 1 | 1 |
| TMQ | Antioxidant | 1 | 1 | 1 | 1 | 1 | 1 |
| IPPD | Antioxidant/Antiozonant | 1 | 1 | 1 | 1 | 1 | 1 |
| Paraffin wax | Wax release agent/lubricant | 1.5 | 1.5 | 1.5 | 1.5 | 1.5 | 1.5 |
| CBS | Primary Accelerator | 1.8 | 1.8 | 1.8 | 1.8 | 1.8 | 1.8 |
| DPG | Diphenylguanidine secondary accelerator | 1.6 | 1.6 | 1.6 | 1.6 | 1.6 | 1.6 |
| Sulphur | Vulcanizing agent | 1.4 | 1.4 | 1.4 | 1.4 | 1.4 | 1.4 |
| TBzTD | Secondary accelerator | 0.2 | 0.2 | 0.2 | 0.2 | 0.2 | 0.2 |

Compositions A to E incorporate kaolin clays K1 to K5 respectively, K2 to K5 of which embody the invention, as a replacement of 30 phr of silica.

The tyre tread rubber compositions were prepared by the process schedule as shown in FIG. 1A.

Referring to FIG. 1A, ingredients were added at stages A, B, C, D, E, F and G to the reaction mixture at pre-determined times during the manufacturing procedure. The ingredients were mixed in a mechanical blender having a variable speed. At stage A, the rubber was added to the blender. At stage B, silica (⅔ of amount), silane (⅔ of amount), carbon black, and stearic acid were added to the blender at about 1 minute into the manufacturing process followed by stage C, in which silica (⅓ of amount), silane (⅓ of amount), IPPD, TMQ, wax, and oil were added to the blender at about 2 minutes into the manufacturing process.

The kaolin clay filler (K1 to K5) may be added to the reaction mixture at stage B and/or C. During stages A, B and C of the process, the mixture was stirred at a speed of 150 rpm with the heating controls of the blender set at a temperature of about 65° C. Step H1 then followed, in which the mixture was dumped at about 150° C. to a cold two roll mill. The mixture was allowed to cool for at least 1 hour to yield the masterbatch for the next stage of the process.

In the next stage, the masterbatch was added at stage D, followed by addition of zinc oxide at stage E to the mixture. Step H2 then followed, in which the mixture was dumped at about 155° C. to a cold two roll mill. The mixture was allowed to cool overnight.

In the next stage of the process, the masterbatch (uncured composition from the previous stage) was added at Stage F, and DPG, TBzTD, CBS and sulphur were added at Stage G. Step H3 then followed, in which the mixture was dumped at about 70° C. to a cold two roll mill. The resultant composition in each run was the uncured rubber composition (A to E and control X), to which FIGS. 2 to 4 refer.

Cured Tyre Tread Rubber Compositions A' to E' and Control X'

The uncured rubber compositions A to E and control X were cured at 150° C. for 15 minutes under a pressure of 2-3000 psi (13-20 MPa) in a heated press, and then conditioned. The resultant composition in each run was the cured rubber composition (A' to E' and control X'), to which FIGS. 5 to 7 refer.

Cured Tyre Tread Rubber Compositions F' to H' and Controls

A series of experiments was designed to determine the properties of truck tread filled natural rubber compositions in which carbon black was replaced by silica, the calcined kaolin and combinations of both. The calcined kaolin used in these experiments was K6. The $d_{50}$ of the particulate calcined kaolin was 0.56 μm.

Twelve tyre tread rubber compositions were prepared, having the general formulation given in Table 5 below:

TABLE 5

| Component | Function | Phr |
| --- | --- | --- |
| SMR10 | Natural rubber | 100 |
| Corax N220 | Carbon black reinforcing filler | Variable |
| Ultrasil 7000 | Silica filler | Variable |
| Si69 | Silane coupling agent | Variable* |
| Calcined Clay K6 | Replacement for silica | Variable |
| Sundex 790 | Process Oil | 2.5 |
| ZnO | Activator | 5 |
| Stearic acid | Activator | 3 |
| Wingstay 100AZ | Antioxidant | 1.5 |

TABLE 5-continued

| Component | Function | Phr |
| --- | --- | --- |
| Santoflex 6PPD | Antioxidant | 1.5 |
| Wax | Lubricant/release aid | 1.5 |
| TBBS | Cure system primary accelerator | 1.2 |
| Sulphur | Vulcanising agent | 1 |
| | Total | 164.7 |

*8 wt % on silica. SMR10 = Standard Malaysian Rubber, Grade 10 with the variations in the amounts of the carbon black, the silica and the calcined kaolin product as shown in Table 6 below:

TABLE 6

| | A | B | C | D |
| --- | --- | --- | --- | --- |
| | | phr of filler | | |
| Series 1 | | | | |
| Carbon Black | 40.3 | 40.3 | 40.3 | 40.3 |
| Silica | 8.0 | 6.4 | 4.0 | 0 |
| Calcined kaolin replacing | | | | |
| 20% of Silica by volume | | 2.08 | | |
| 50% of Silica by volume | | | 5.20 | |
| 100% of silica by volume | | | | 10.40 |
| Series 2 | | | | |
| Carbon Black | 33.1 | 33.1 | 33.1 | 33.1 |
| Silica | 16.0 | 12.8 | 8.0 | 0 |
| Calcined kaolin replacing | | | | |
| 20% of silica by volume | | 4.16 | | |
| 50% of silica by volume | | | 10.40 | |
| 100% of silica by volume | | | | 20.8 |
| Series 3 | | | | |
| Carbon Black | 25.9 | 25.9 | 25.9 | 25.9 |
| Silica | 24.0 | 19.2 | 12.0 | 0 |
| Calcined kaolin replacing | | | | |
| 20% of silica by volume | | 6.24 | | |
| 50% of silica by volume | | | 15.6 | |
| 100% of silica by volume | | | | 31.2 |

As shown in Table 6, the twelve experimental compositions were divided into three series. In the first composition (column A) of the first series, 8 phr (15.1% by volume) of the carbon black were replaced with silica. In the first composition (column A) of the second series, 16 phr (30.3% by volume) of the carbon black were replaced with silica: In the first composition (column A) of the third series, 24 phr (45.5% by volume) of the carbon black were replaced with silica. In each series, 20, 50 and 100% by volume of the silica was also replaced by the calcined kaolin (respectively, columns B, C and D Table 6), thereby maintaining a constant filler volume in all replaced by calcined clay, thereby maintaining a constant filler volume in all compositions.

Compositions F', G' and H', to which FIGS. 8 to 12 relate, were the compositions shown in column D of respectively the first, second and third series of Table 6.

Controls SC-F', SC-G' and SC-H', to which FIGS. 8 to 12 also relate, were the compositions shown in column A of respectively the first, second and third series of Table 6.

The control composition Y' shown in FIGS. 8 to 12 contained 47.5 phr of carbon black, no silica, no silane and no calcined kaolin, but otherwise follows Table 5.

Figure 1B:
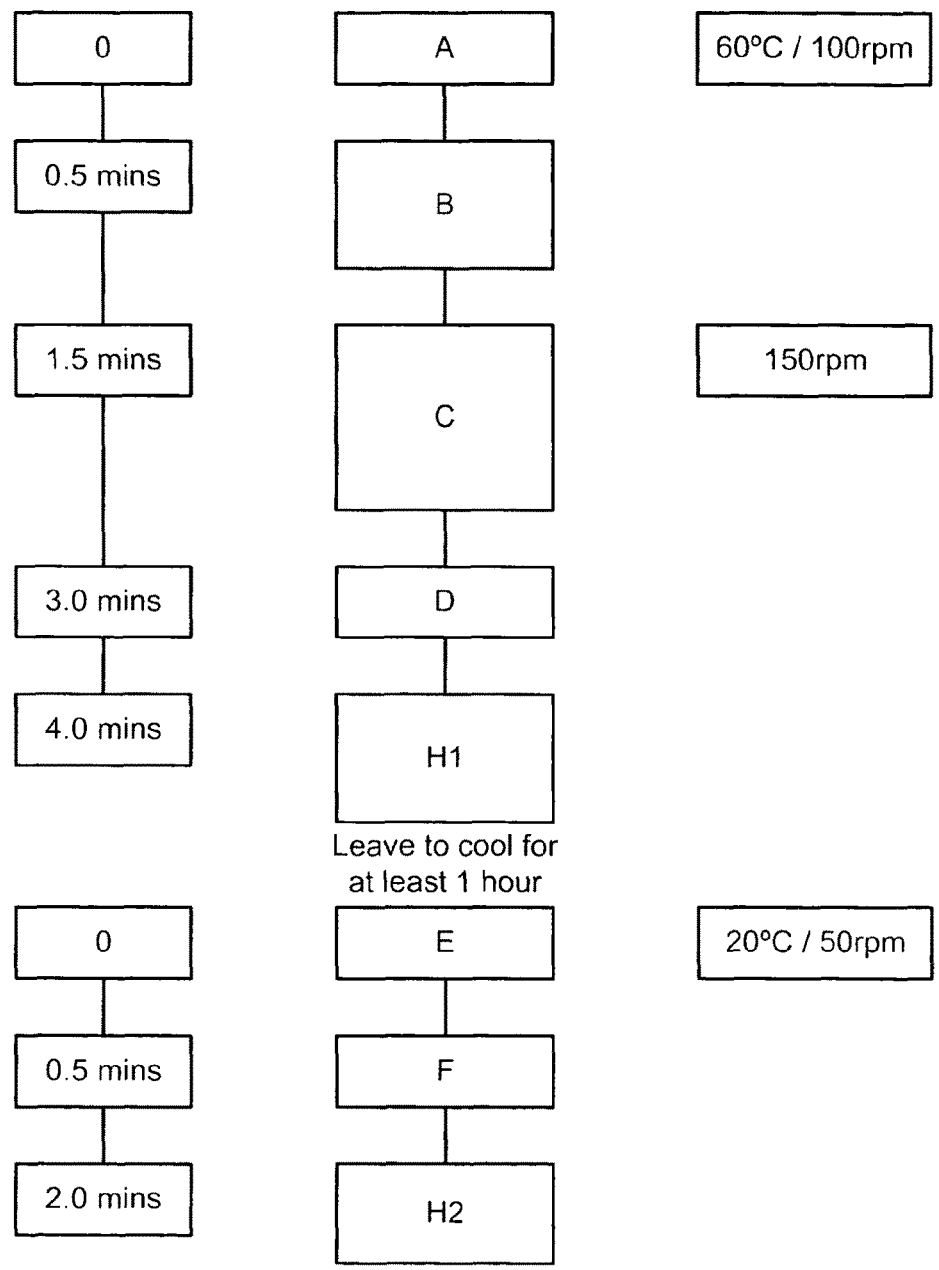
FIG. 1B is an illustration of a second embodiment of process steps for the manufacture of a tyre tread rubber composition.

The tyre tread rubber compositions were prepared by the process schedule as shown in FIG. 1B.

Referring to FIG. 1B, ingredients were added at stages A, B, C, E and F to the reaction mixture at pre-determined times during the manufacturing procedure. The ingredients were mixed in a mechanical blender having a variable speed. At stage A, the rubber was added to the blender. At stage B, the filler (⅔ of amount) and silane (⅔ of amount, if needed) were added to the blender at about 30 seconds into the manufacturing process followed by stage C, in which filler (⅓ of amount), silane (⅓ of amount, if needed), process oil, activator, antioxidant/anti-degradant and lubricant were added to the blender at about 1.5 minutes into the manufacturing process.

The kaolin clay was included in the filler added at stage B. During stages A and B of the process, the mixture was stirred at a speed of 100 rpm with the blender temperature controls set to about 60° C. During stage C of the process, the mixture was stirred at a speed of 150 rpm with the blender temperature controls set to a temperature of about 60° C. Step D followed at about 3.0 minutes into the manufacturing process, when any materials lodged in the feed hopper of the blender were brushed into the mixing chamber (brush-down). Step H1 then followed for those compositions which contained silica in the filler, in which the mixture was dumped at about 160° C. to a cold two roll mill. The mixture was allowed to cool for at least 1 hour to yield the masterbatch for the second phase of the process.

In the second phase of the process, the masterbatch was added back into the compounder at stage E, followed after about 30 seconds by addition of the cure system (vulcanising agent and accelerator) to the mixture at stage F. Step H2 then followed, in which the mixture was dumped at 70° C. to a cold mill. The mixture was allowed to cool, to yield the final product. During stages E and F of the process, the mixture was stirred at a speed of 50 rpm with the temperature control of the blender set to about 20° C.

The compositions were cured at 150° C. for 15 minutes under a pressure of 2-3000 psi (13-20 MPa) in a heated press, and then conditioned.

The resultant compositions are the cured rubber compositions listed in Tables 5 and 6, and the carbon black control Y'.

Cured Tyre Tread Rubber Compounds I' to K', EA-I' to EA-K', EAS-I' to EAS-K' and Controls The cured compositions I' to K' were prepared generally analogously to cured compositions F' to H' described above (i.e. based on the compositions shown in column D of respectively the first, second and third series of Table 6), but with the following differences.

The kaolin clay filler was pre-treated with 3% of the organosilane A189 (Osi-Crompton), by weight of the kaolin. In addition, the compounding procedure was simplified, as shown in FIG. 1C.

Figure 1C:
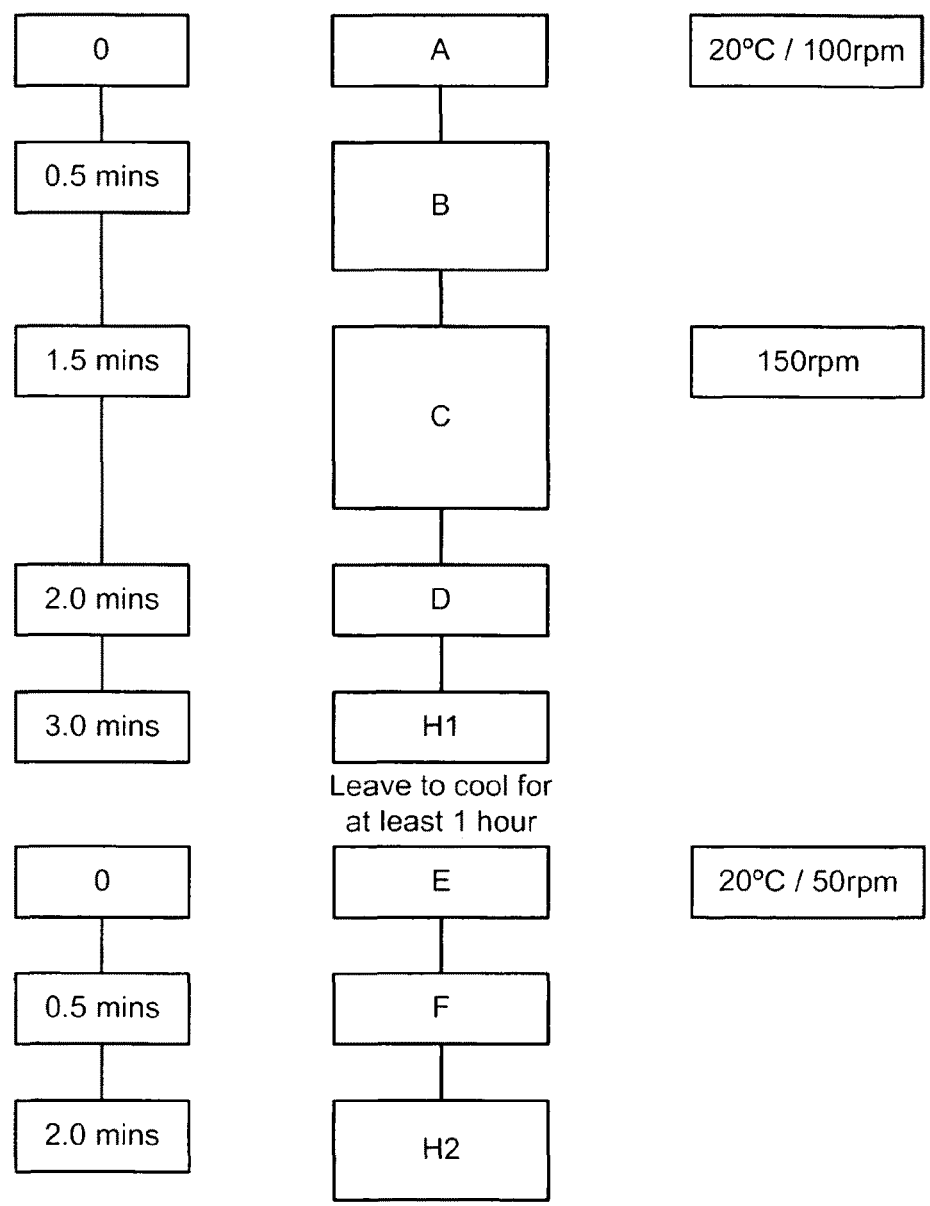
FIG. 1C is an illustration of a third embodiment of process steps for the manufacture of a tyre tread rubber composition.

Referring to FIG. 1C, ingredients were added at stages A, B, C, E and F to the reaction mixture at pre-determined times during the manufacturing procedure. The stages and procedure were as described for FIG. 1B, except that the silane was omitted from the added ingredients, because silica was absent from the formulation and the kaolin clay had been pre-treated with organosilane. During stages A and B of the process, the mixture was stirred at a speed of 100 rpm with the temperature control of the blender set to about 20° C. During stage C of the process, the mixture was stirred at a speed of 150 rpm at a temperature of about 20° C. Step D (brush down) followed at about 2.0 minutes into the manufacturing process. Step H1 then followed, in which the mixture was dumped at a temperature of about 120° C. to a cold mill The mixture was allowed to cool for at least 1 hour to yield the masterbatch for the second phase of the process.

The second phase of the process (stages E, F and H2) was as described above for FIG. 1B.

Compositions EA-I' to EA-K' and EAS-I' to EAS-K' were prepared analogously to I' to K', except that, in the case of EA-I' to EA-K', an additional 0.2 phr of the cure accelerator N-tert.butyl-2-benzothiazole-sulphenamide was present in the cure system, and, in the case of EAS-I' to EAS-K', an extra 0.2 phr of the cure accelerator N-tert.butyl-2-benzothiazole-sulphenamide and an extra 0.4 phr of the vulcanising agent sulphur were present in the cure system.

The control composition Y' was prepared using the same composition as the control composition of FIGS. 8 to 12, but employing the modified compounding process shown in FIG. 1C.

The compositions were cured at 150° C. for 15 minutes under a pressure of 2-3000 psi (13-20 MPa) in a heated press, and then conditioned.

Test Methods

Important dynamic properties of a tyre tread composition include processability, rolling resistance, and wet traction. The following test methods were used, to evaluate the rubber compositions for these properties.

Processability

During the manufacture of a tyre tread composition, processing and forming steps may be employed, such as, for example milling; extrusion; moulding, which can apply different strain levels to an uncured rubber composition. Elastic or Storage Modulus, G', is a measure of the processability of an uncured rubber composition at the different strain levels. Normally, G' may be determined at 120% strain. Desirably, an uncured composition may have a relatively low G' which indicates better processability, and a relatively high tan δ.

Rolling Resistance

This property is concerned with energy loss from a vehicle caused by distortion of the tyre rubber at a particular frequency, that is—the deflection of a tyre as the tyre revolves in use. Tan δ (ratio of viscous modulus to elastic modulus) is a material property which can be measured in the laboratory. It is generally recognised in the art that tan δ measured using forced vibration tests at 1 to 10 Hz and moderately elevated temperature (e.g. 60° C. to 70° C.) may give a reasonably accurate indication of rolling resistance. It is desirable to have a relatively low tan δ under these test conditions, which indicates low rolling resistance. Low rolling resistance is advantageous because a tyre made of such a rubber will be expected to roll less energetically and less fuel will be required to propel the vehicle.

Wet Traction

This property may also be referred to as wet grip or skid resistance. Wet traction is concerned with energy loss from a tyre caused by distortion, for instance under braking conditions. Tan δ determined by forced vibration tests at a frequency of 10 to 30 Hz and a temperature of 0° C. may be used as an indicator for wet traction. It is desirable to have a relatively high tan δ under these test conditions, which indicates better wet traction.

Abrasion Resistance

Abrasion resistance is measured according to the DIN test method, in which a sample specimen is contacted with a rotating drum covered with a standardised abrasive paper. Abrasion resistance is expressed as the volume loss during one traverse of the drum, so that the lower the figure, the higher the abrasion resistance.

Crescent Tear Strength ("C-Tear Strength")

Tear Strength is defined as the force required to propagate a cut through a specimen of rubber composition. A crescent shaped test piece is used with a 1 mm cut per the method of ISO R34, 1979.

Tensile Strength

Tensile Strength is the maximum stress when a sample specimen reaches its maximum elongation. This physical property is measured in MPa and is well known to one of ordinary skill in this art.

Elongation

Elongation is the maximum elongation of a sample specimen before failure. This physical property is measured in % and is well known to one of ordinary skill in this art.

Hardness

Hardness is defined as the resistance to indentation under conditions which do not puncture a test sample (localised plastic deformation). This property was measured using a dead weight loading method and results are expressed as International Rubber Hardness Degrees (IRHD).

Test Results and Discussion

Processability Tests on Compositions A to E

The compositions and the control composition were roll milled to give a sheet. Samples of each tyre tread composition were then tested for processability.

Processability for each of the six uncured tyre tread compositions was determined using a Rubber Process Analyser machine manufactured by Alpha Technologies. Measurements were taken at a temperature of 100° C., a frequency of 0.1 Hz, and strain level was varied from 1 to 100%. The results are set forth in FIGS. 2, 3 and 4.

Figure 2:
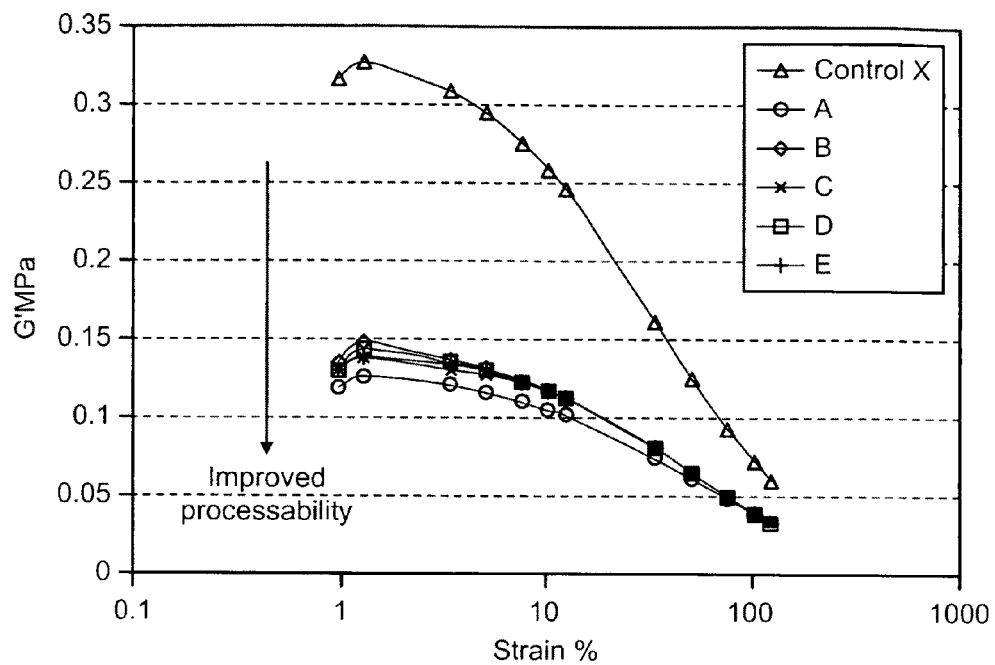
FIG. 2 is a graph of Elastic Modulus, G' (MPa) versus % strain to illustrate the processability of five uncured tyre tread rubber compositions A to E, incorporating kaolin clays and precipitated silica, compared to a control uncured tyre tread rubber composition X, incorporating only precipitated silica filler.
Figure 3:
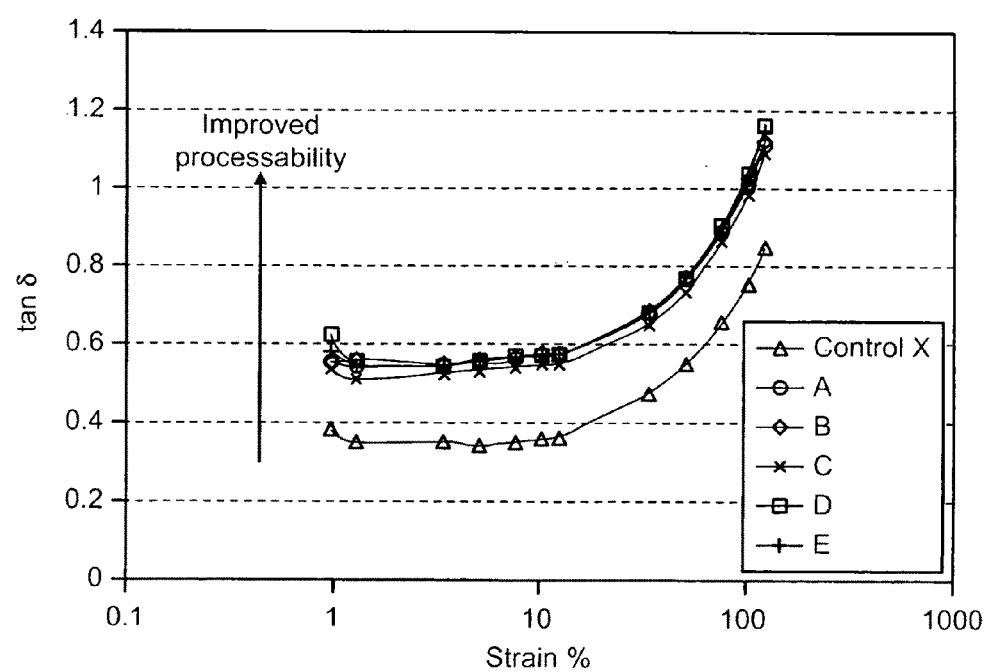
FIG. 3 is a graph of tan δ versus % strain to illustrate the processability of the same five uncured tyre tread rubber compositions, incorporating kaolin clays and silica, compared to the same control uncured tyre tread rubber composition X incorporating only silica filler.
Figure 4:
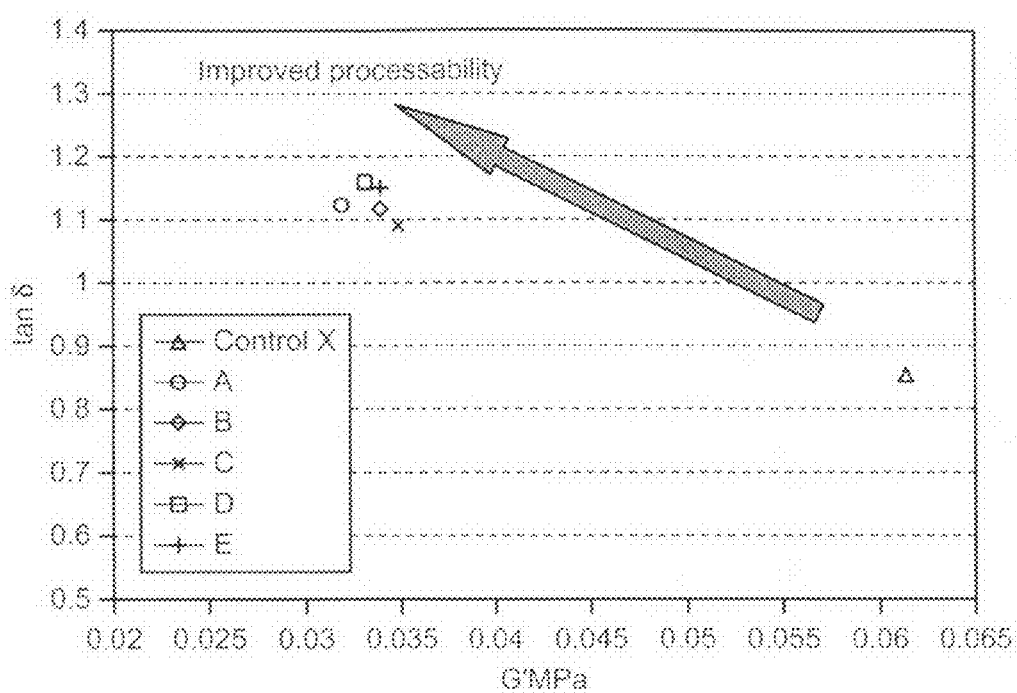
FIG. 4 is a graph of tan δ versus Elastic Modulus, G' (MPa) to illustrate the processability of the same five uncured tyre tread rubber compositions, incorporating kaolin clays and silica, compared to the same control uncured tyre tread rubber composition X incorporating only silica filler.

Referring to FIG. 2, a plot of G' versus strain %, it can be seen that uncured rubber compositions A (incorporating comparison kaolin clay K1) and B to E (incorporating respective kaolin clays K2 to K5 and embodying the invention), have an improved processability, that is a lower uncured elastic modulus G', compared to the control rubber composition X, which incorporates no kaolin clay filler. Referring to FIG. 3, a plot of tan δ versus strain %, it can similarly be seen that rubber compositions A to E have an improved processability, that is a higher uncured tan δ, compared to the control rubber composition X which contains no kaolin clay. The overall improvement in processability for compositions A to E compared with the control X, across the measured strain range, can also be observed in FIG. 4 which is a plot of uncured tan δ versus uncured G'.

Rolling Resistance Tests on Compositions A' to E'

Rolling resistance for each of the six cured tyre tread compositions (A' to E' and control X') was determined using a Rubber Process Analyser. Measurements were taken at a temperature of 75° C., a frequency of 10 Hz, and at a strain level of 10%. The results are set forth in FIG. 5.

Figure 5:
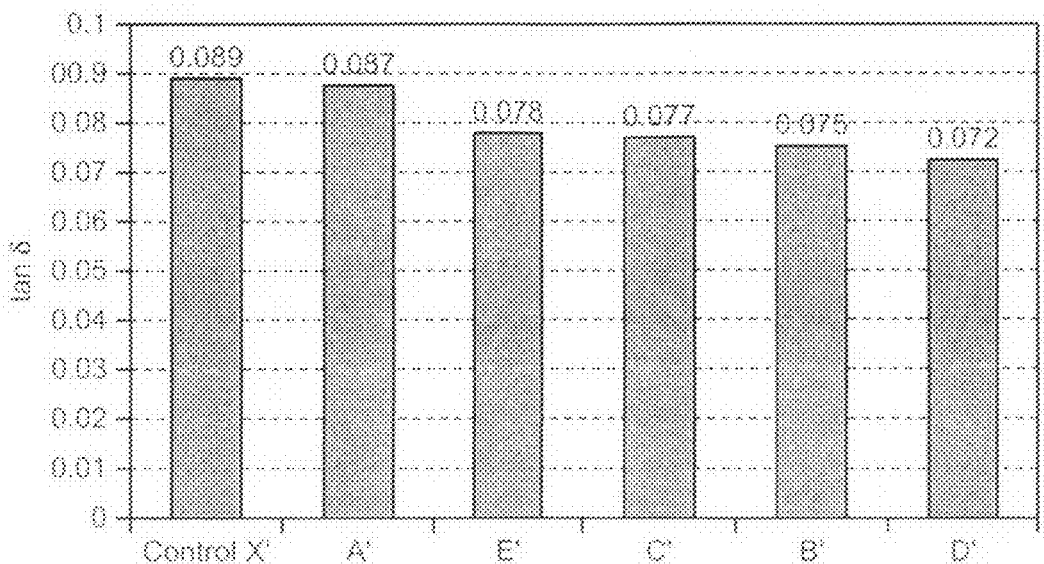
FIG. 5 is a bar chart illustrating the rolling resistance (tan δ) of five cured tyre tread rubber compositions A' to E', incorporating kaolin clays and silica, compared to a control cured tyre tread rubber composition X', incorporating only silica filler.

Referring to FIG. 5, the results show that rubber compositions A' to E' containing kaolin clays K1 to K5 as a partial replacement of silica, by 30 phr, have an improved rolling resistance, that is a lower tan δ, compared to the control composition X', which contains no kaolin clay. Composition A', outside the present invention, has a rolling resistance very similar to the control X'. The composition B', containing hydrous clay K2, has a lower tan δ at 0.075; of the calcined clay compositions, the composition D', containing K4 (flash calcined K2), has the lowest tan δ at 0.072, which is most preferred.

Wet Traction Tests on Compositions A' to E'

Wet traction for each of the six cured tyre tread compositions (A' to E' and control X') was determined using a DMTA machine operating in a tensile mode. Measurements of tan δ were taken at a temperature of 0° C. The results are set forth in FIG. 6.

Figure 6:
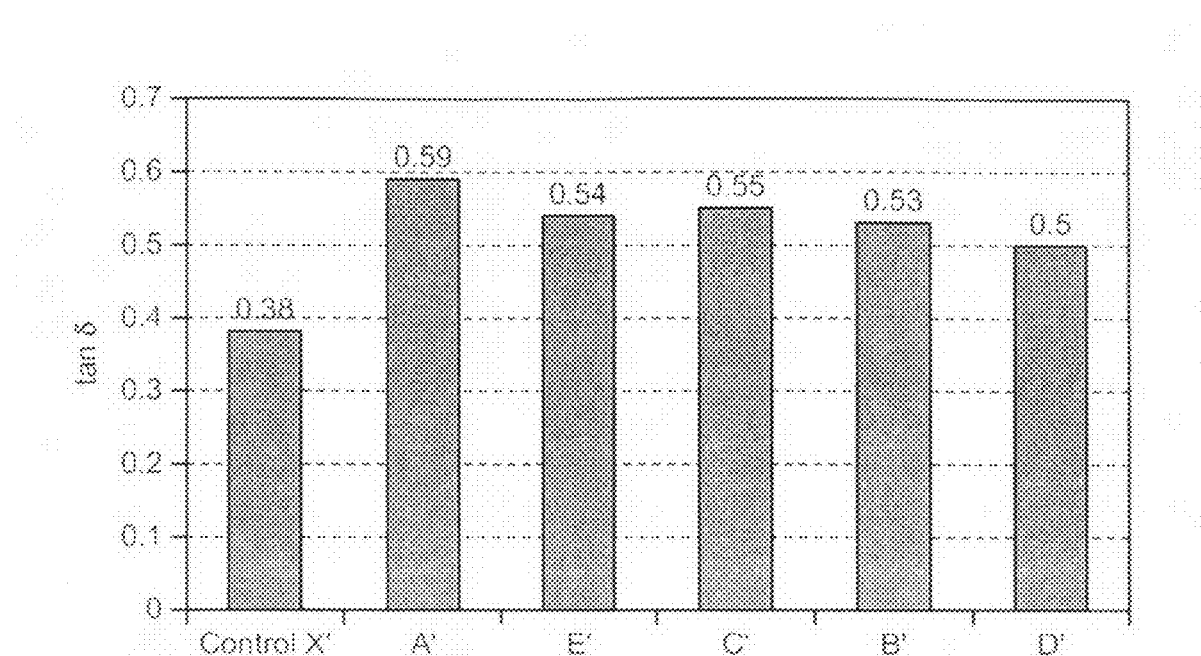
FIG. 6 is a bar chart illustrating the wet fraction (tan δ at 0° C.) of the same five cured tyre tread rubber compositions, incorporating kaolin clays and silica, compared to the same control cured tyre tread rubber composition X' incorporating only silica filler.

From FIG. 6, it can be seen that rubber compositions A' to E', which contain kaolin clays K1 to K5 as fillers, have an improved wet fraction, that is a higher tan δ, compared to the control composition X', which contains no kaolin clay.

Abrasion Resistance Tests on Compositions A' to E'

Abrasion resistance was determined for each of the six cured tyre tread compositions (A' to E' and control X'). The results are set forth in FIG. 7.

Figure 7:
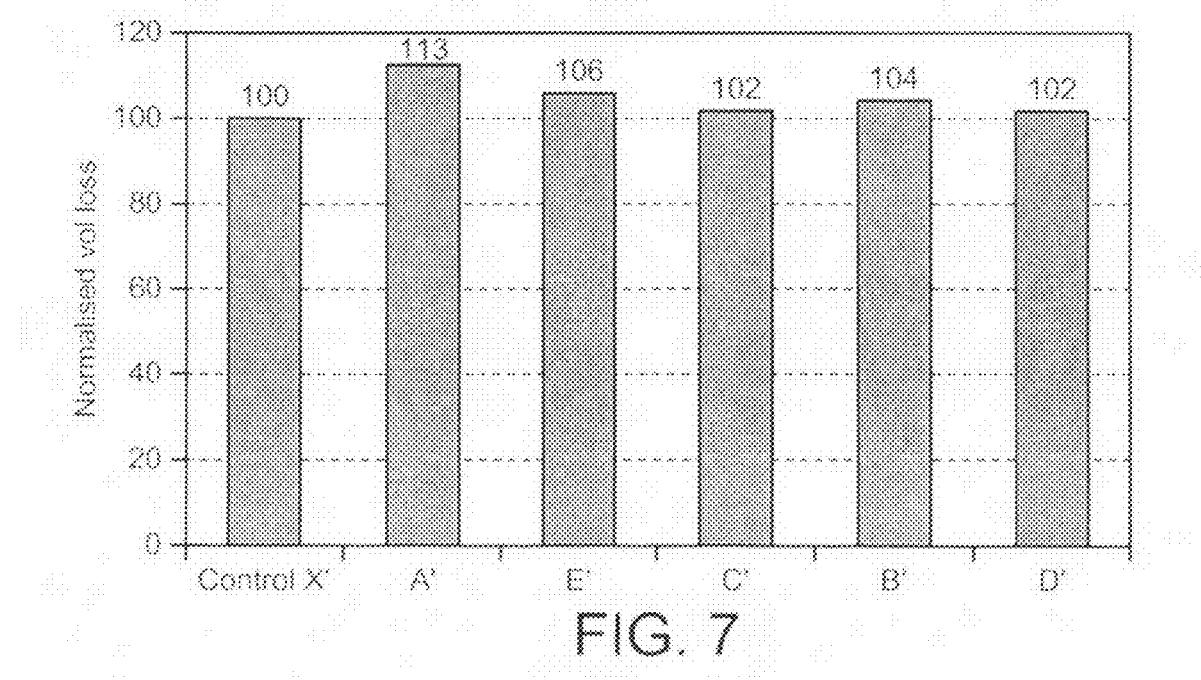
FIG. 7 is a bar chart illustrating the abrasion resistance of the same five cured tyre tread rubber compositions, incorporating kaolin clays and silica, compared to the same control cured tyre tread rubber composition X' incorporating only silica filler.
Figure 8:
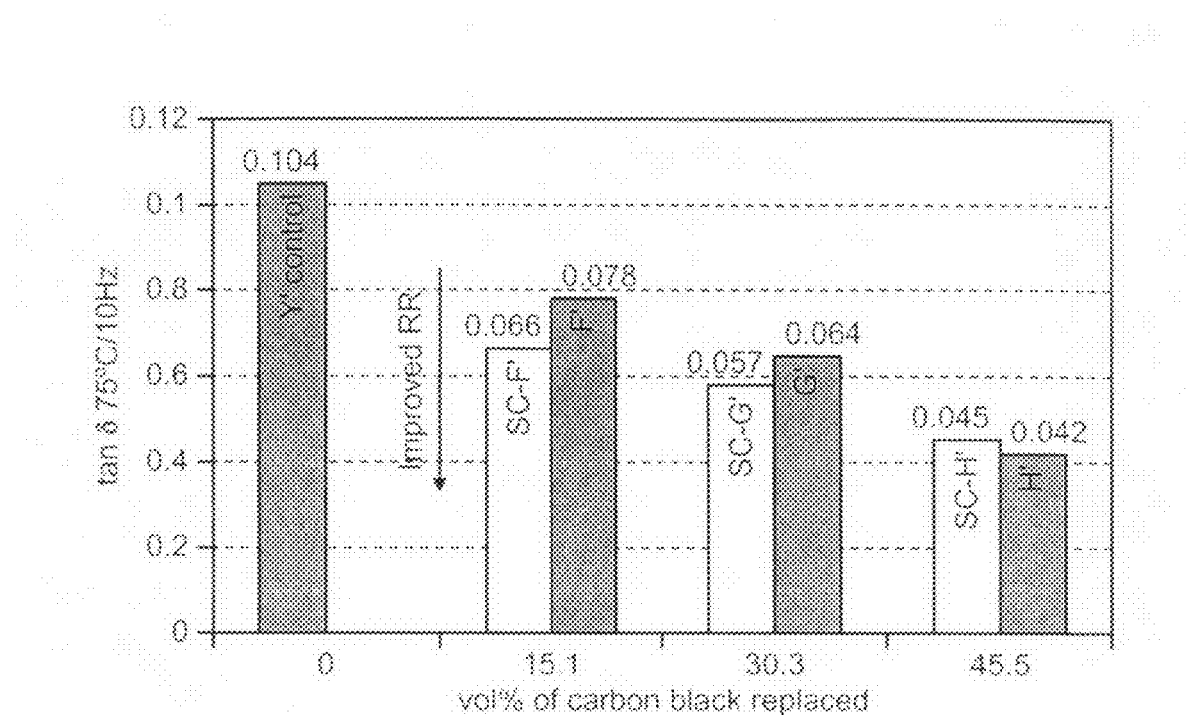
FIG. 8 is a bar chart illustrating the rolling resistance (tan δ) of three cured truck tyre tread rubber compositions F' to H', incorporating kaolin clays and varying amounts of carbon black, compared to a control cured truck tyre tread rubber composition Y', incorporating only carbon black filler and compared also to three analogous cured truck tyre tread rubber compositions outside the present invention (SC-F' (i.e. silica control corresponding to F'), SC-G' and SC-H'), in which the same volume of precipitated silica was used in place of the kaolin clay filler.

From FIG. 7, the control composition X' has a better abrasion resistance compared to the compositions incorporating kaolin clays and in accordance with the invention. The compositions C' and D' have an abrasion resistance close to that of the control composition X'. Composition A', outside the present invention, has the poorest abrasion resistance.

Crescent Tear Strength, Tensile Strength, Elongation and Hardness Tests on Compositions A' to E'

These properties of the six cured tyre tread compositions (A' to E' and control X') were determined and the results are set forth in Table 7, as follows:

TABLE 7

|    | C-Tear N/mm | Tensile Strength MPa | Elongation % | Hardness IRHD |
|----|-------------|----------------------|--------------|---------------|
| X' | 32.9        | 18.5                 | 374          | 70            |
| A' | 28.3        | 19.2                 | 494          | 65            |
| B' | 36.0        | 17.3                 | 398          | 70            |
| C' | 28.6        | 22.0                 | 510          | 72            |
| D' | 35.6        | 18.8                 | 480          | 71            |
| E' | 35.7        | 18.8                 | 413          | 70            |

The results show that rubber compositions B', D' and E' have superior crescent tear compared to the control composition X'. The tensile strength for the rubber compositions were statistically similar; however, composition C' had an improved elongation. The hardness results for all the rubber compositions were similar, apart from composition A', which was lower.

Rolling Resistance Tests on Compositions F' to H'

Rolling resistance for each of the seven cured tyre tread compositions (F' to H', the three comparison compositions from Table 6 and the control Y') was determined using a Rubber Process Analyser (RPA2000). Measurements of tan δ were taken at a temperature of 75° C., a frequency of 10 Hz, and at a strain level of 10%. The results are set forth in FIG. 8.

The data show that the rolling resistance of the composition is significantly improved when carbon black is replaced with either silica or calcined kaolin.

Abrasion Resistance Tests on Compositions F' to H'

Figure 9A:
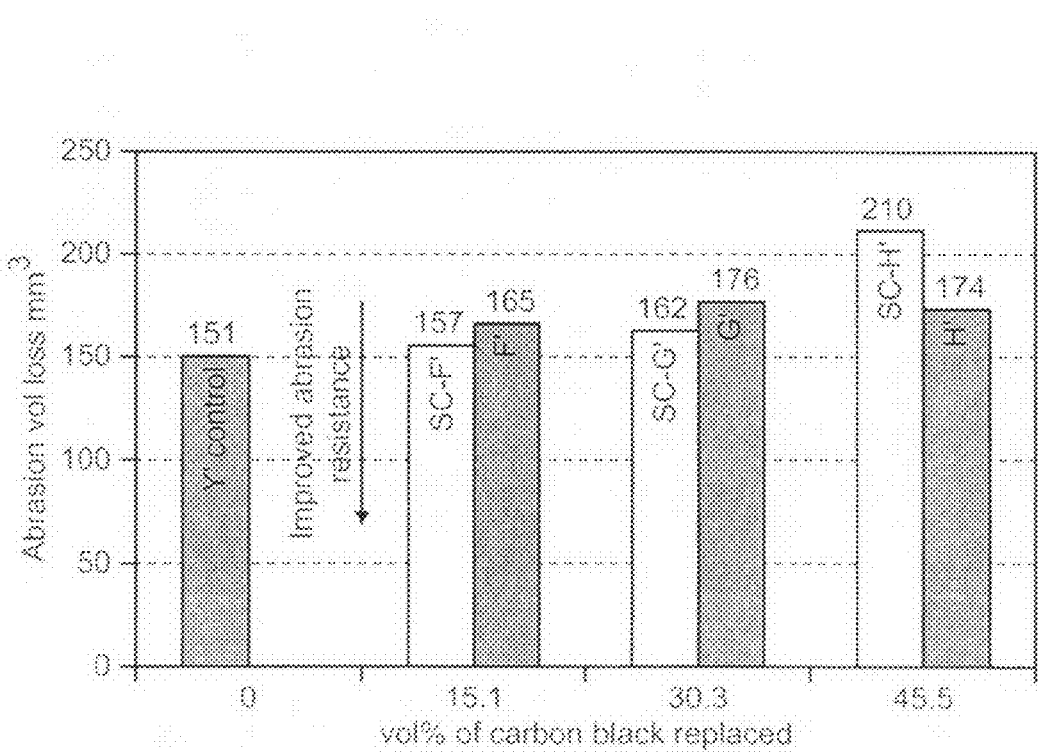
FIG. 9A is a bar chart illustrating the abrasion resistance of the same three cured truck tyre tread rubber compositions, incorporating kaolin clays and varying amounts of carbon black, compared to the same controls as shown in FIG. 8.

Abrasion resistance for each of the seven cured tyre tread compositions (F' to H', the three comparison compositions from Table 6 and the control Y') was determined using the test method already described. The results are shown in FIG. 9A.

As the volume of carbon black replaced increased, the abrasion resistance of the compositions deteriorated. Compositions containing calcined kaolin filler were worse than those containing silica, except at the highest substitution level where the composition containing silica showed a sudden decline in performance.

Figure 9B:
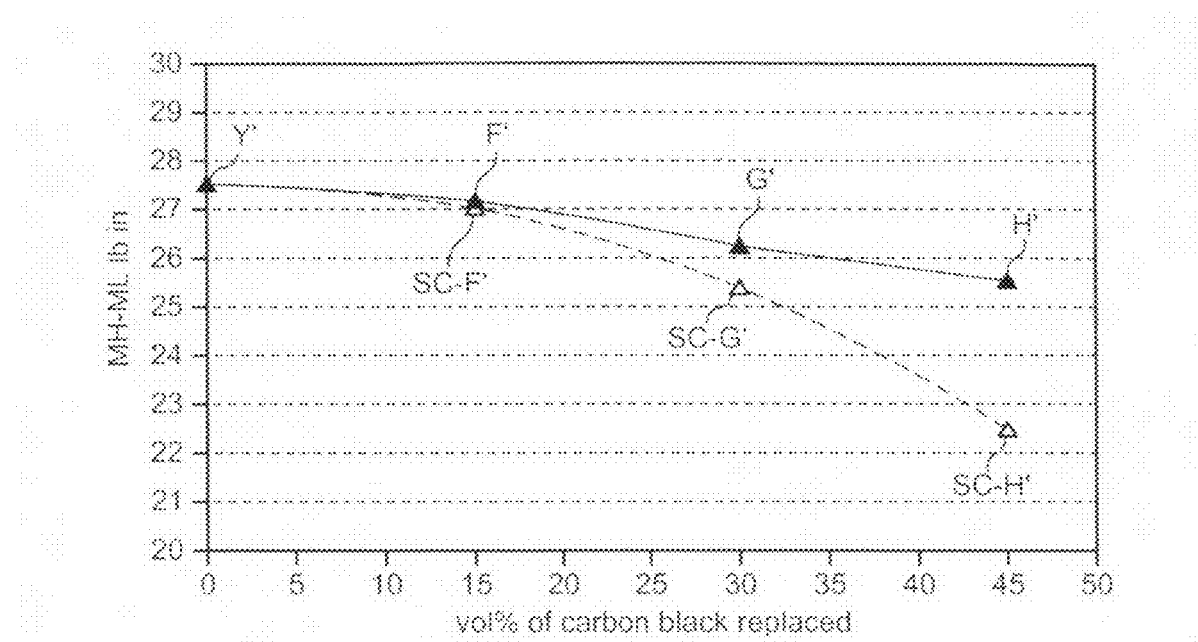
FIG. 9B shows the relationship between the difference (MH−ML) between the maximum and minimum torque of the same three cured truck tyre tread rubber compositions, incorporating kaolin clays and varying amounts of carbon black, compared to the same controls as shown in FIG. 8, to illustrate the effect of replacement of carbon black by silica and calcined kaolin on cross-link density of the vulcanisate.

Silica can have an adverse effect on the cross-link density of the vulcanisate due to the ability of curatives to absorb onto the silica surface during compounding. The resulting reduction in cross-link density can be crudely predicted by the difference between maximum and minimum torque (MH–ML) as measured on a cure rheometer. In FIG. 9B, the value of MH–ML is plotted as a function of the vol % of carbon black replaced by silica and calcined kaolin. The data suggest that the cross-link density is significantly reduced as the amount of silica in the composition increases.

Tear Strength Tests on Compositions F' to H'

Figure 10:
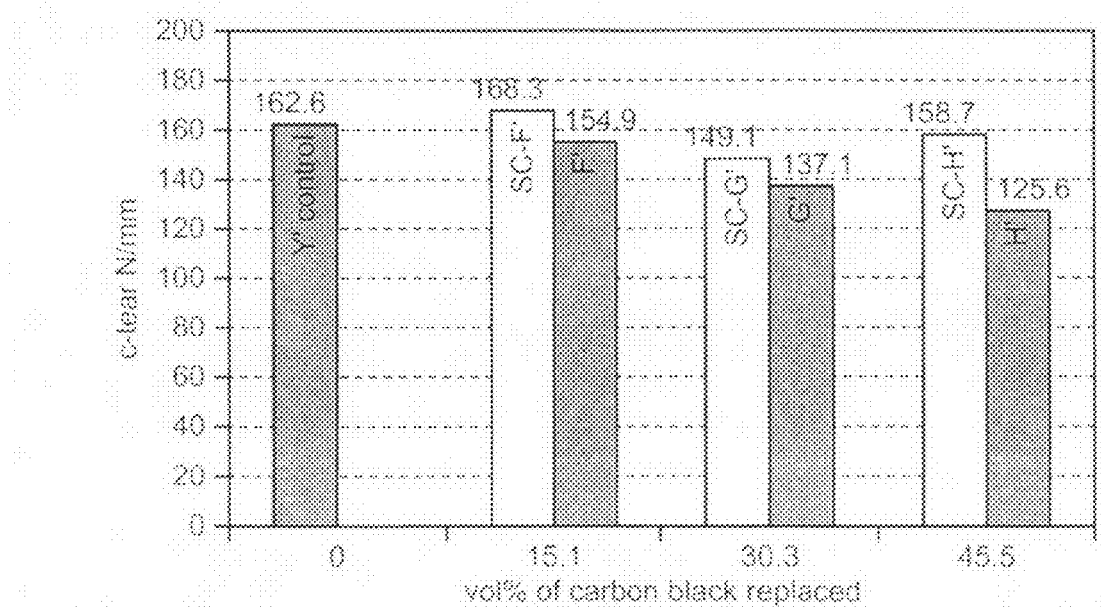
FIG. 10 is a bar chart illustrating the crescent tear strength of the same three cured truck tyre tread rubber compositions, incorporating kaolin clays and varying amounts of carbon black, compared to the same controls as shown in FIG. 8.

Tear strength for each of the seven cured tyre tread compositions (F' to H', the three comparison compositions from Table 6 and the control Y') was determined using the test method already described. The results are shown in FIG. 10.

The data show that incorporating calcined clay reduces the tear strength of the compositions significantly above 15 vol %.

Tensile Strength Tests on Compositions F' to H'

Figure 11:
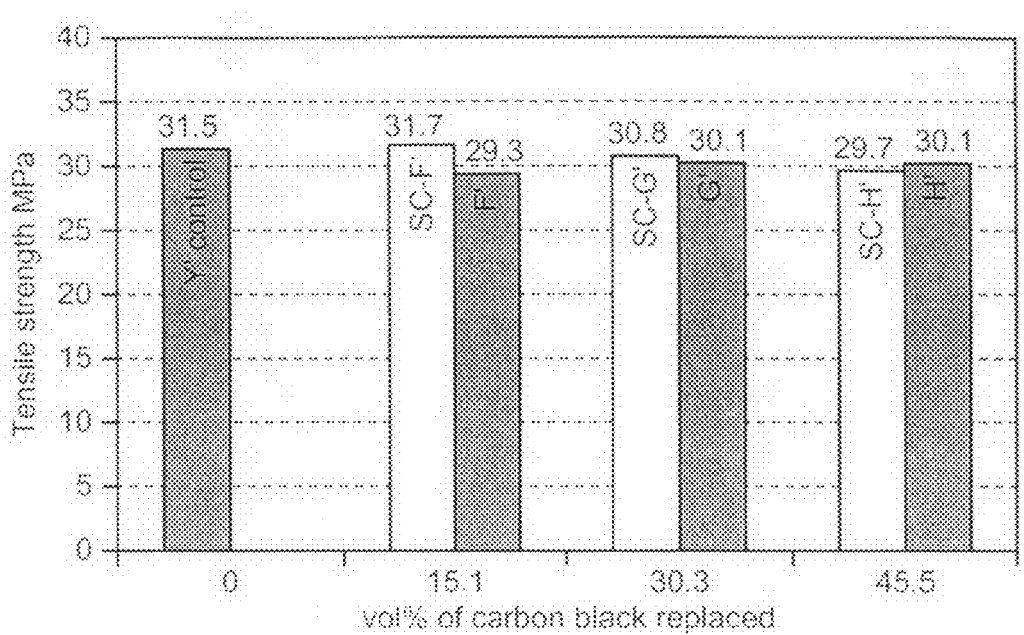
FIG. 11 is a bar chart illustrating the tensile strength of the same three cured truck tyre tread rubber compositions, incorporating kaolin clays and varying amounts of carbon black, compared to the same controls as shown in FIG. 8.

Tensile strength for each of the seven cured tyre tread compositions (F' to H', the three comparison compositions from Table 6 and the control Y') was determined. The results are shown in FIG. 11.

The results show that introducing silica or calcined clay into the composition has little effect on the tensile strength.

Hardness Tests on Compositions F' to H'

Figure 12:
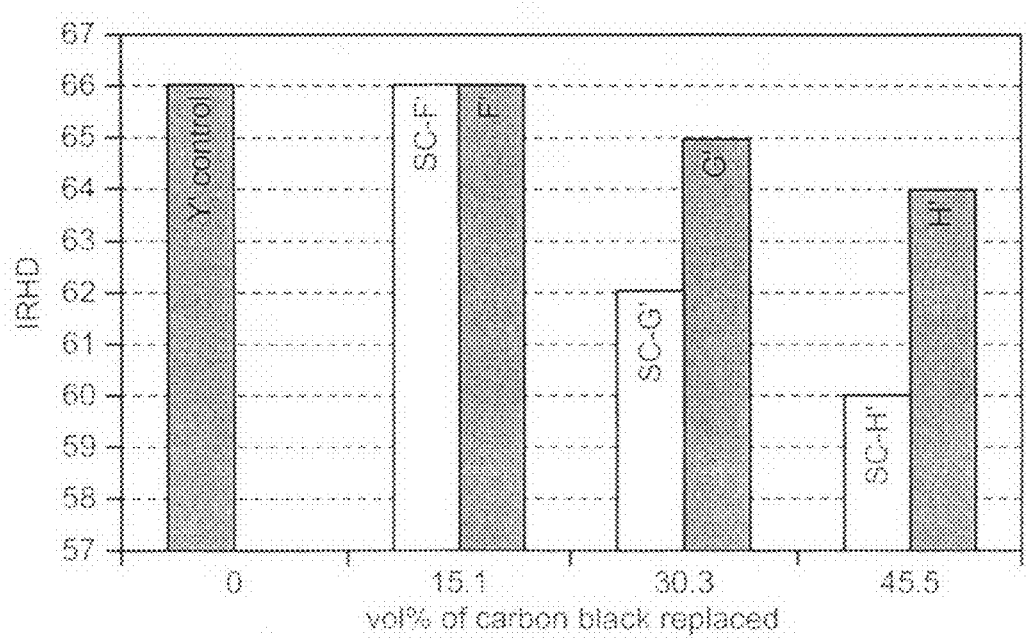
FIG. 12 is a bar chart illustrating the hardness of the same three cured truck tyre tread rubber compositions, incorporating kaolin clays and varying amounts of carbon black, compared to the same controls as shown in FIG. 8.

Hardness of each of the seven cured tyre tread compositions (F' to H', the three comparison compositions from Table 6 and the control Y') was determined using the test method already described. The results are shown in FIG. 12.

The results show that, when 15.1 volume % of carbon black in the composition is replaced by silica or calcined kaolin, the hardness is maintained. Above this level, compositions containing silica are softer. Compositions containing calcined kaolin are still 97% of the control value at the highest substitution level. Hardness is closely related to cross-link density.

Rolling Resistance Tests on Compositions I' to K'

Figure 13:
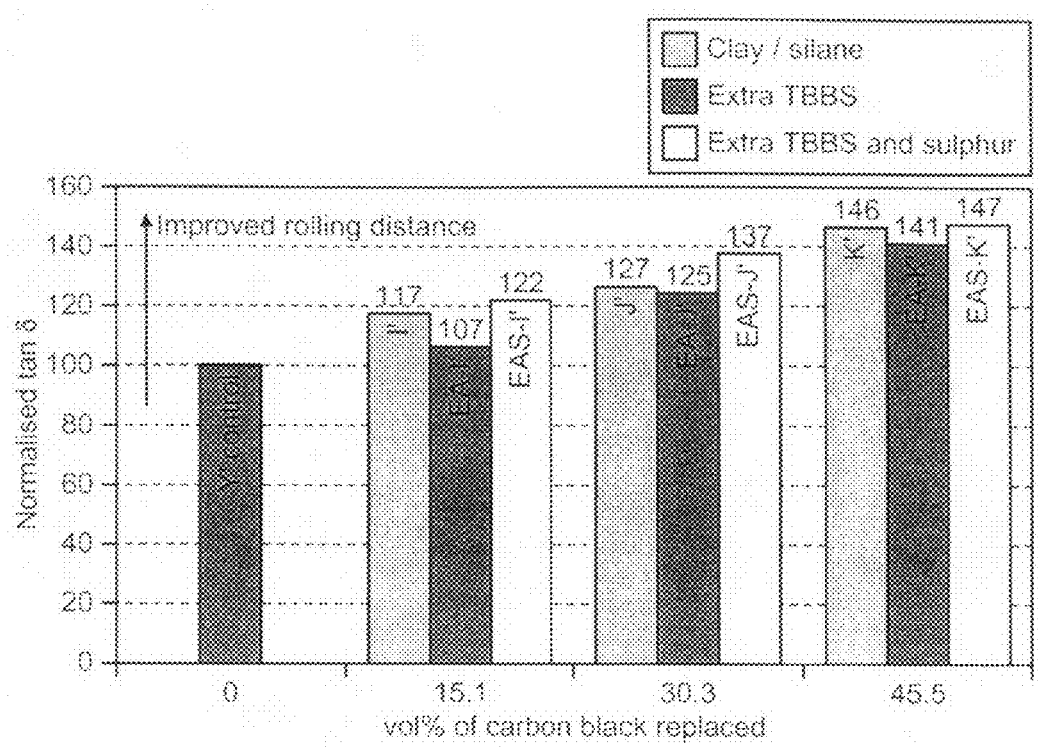
FIG. 13 is a bar chart illustrating the rolling resistance (normalised tan δ) of three cured truck tyre tread rubber compositions I' to K', incorporating organosilane coated kaolin clays and varying amounts of carbon black, compared to the same control cured truck tyre tread rubber composition Y', incorporating only carbon black filler; and compared also to three analogous cured truck tyre tread rubber compositions within the present invention (EA-I' (i.e. Extra Accelerator repetition of cure method for I'), EA-J' and EA-K'), in which the cure conditions for the rubbers were modified by the presence of an additional 0.2 phr accelerator; and compared also to three analogous cured truck tyre tread rubber compositions within the present invention (EAS-I' (i.e. Extra Accelerator and Sulphur repetition of cure method for I'), EAS-J' and EAS-K'), in which the cure conditions for the rubbers were modified by the presence of an additional 0.2 phr accelerator and an extra 0.4 phr sulphur.

Rolling resistance for each of the ten cured tyre tread compositions (I' to K', the three comparison compositions EA-I', EA-J' and EA-K', the three comparison compositions EAS-I', EAS-J' and EAS-K', and the control Y') was determined using a Rubber Process Analyser (RPA2000). Measurements were taken at a temperature of 75° C., a frequency of 10 Hz, and at a strain level of 10%. The results are set forth in FIG. 13.

The results show that replacing carbon black with silane-treated calcined kaolin improves the rolling resistance of the tread composition. Adjusting the cure system by adding extra accelerator and sulphur gives better performance than increasing the amount of accelerator alone.

Abrasion Resistance Tests on Compositions I' to K'

Figure 14:
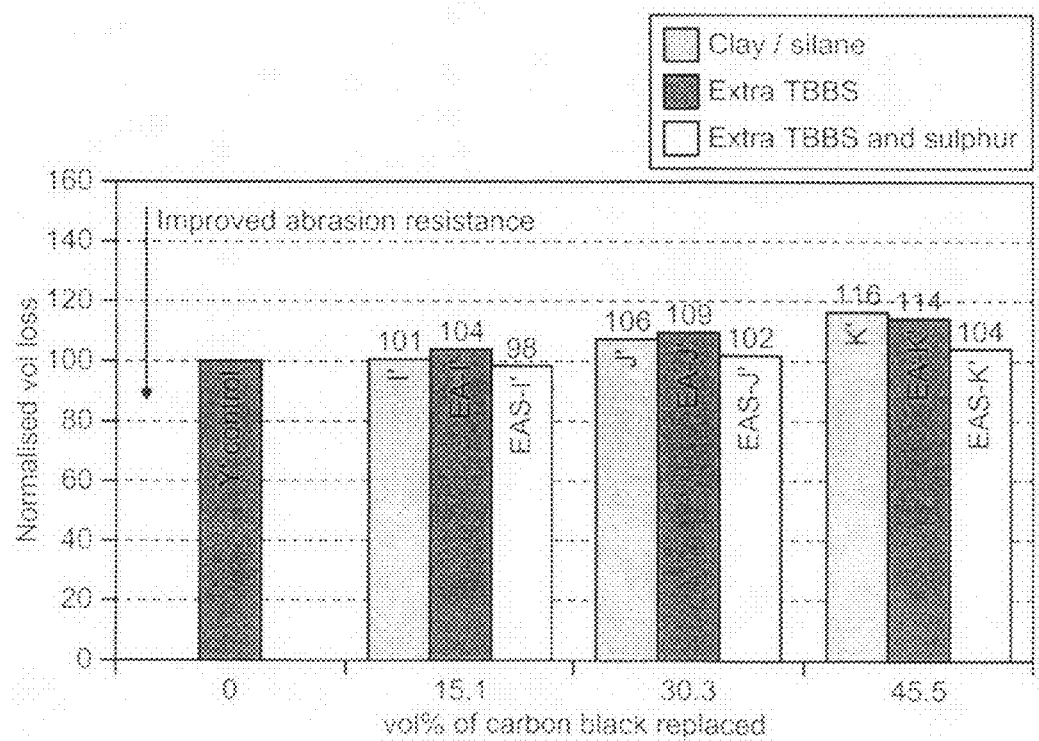
FIG. 14 is a bar chart illustrating the abrasion resistance of the same cured truck tyre tread rubber compositions as shown in FIG. 13, against the same control.

Abrasion resistance for each of the same ten cured tyre tread compositions was determined using the test method already described. See FIG. 14.

The results show that replacing 15 vol % of the carbon black with silane-treated calcined kaolin product has no adverse effect on the abrasion of the composition relative to the control. At higher loading, abrasion resistance begins to deteriorate. Adding extra accelerator when formulating the composition appears to have no effect on the abrasion resistance. Increasing the sulphur as well as the accelerator maintains the abrasion resistance to that of the control composition.

Tear Strength Tests on Compositions I' to K'

Figure 15:
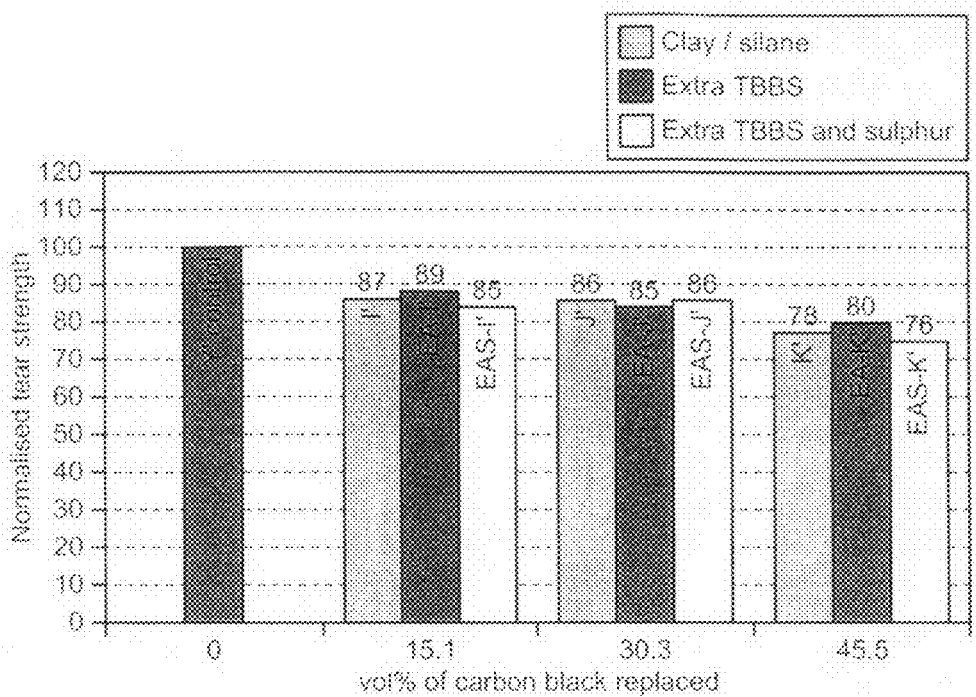
FIG. 15 is a bar chart illustrating the crescent tear strength of the same cured rubber compositions as shown in FIG. 13, against the same control.

Tear strength for each of the same ten cured tyre tread compositions was determined using the test method already described. See FIG. 15.

The results show that the tear strength of the compositions incorporating silane-treated calcined kaolin are all worse than the control. Altering the cure system has no effect on the tear strength.

Tensile Strength Tests on Compositions I' to K'

Figure 16:
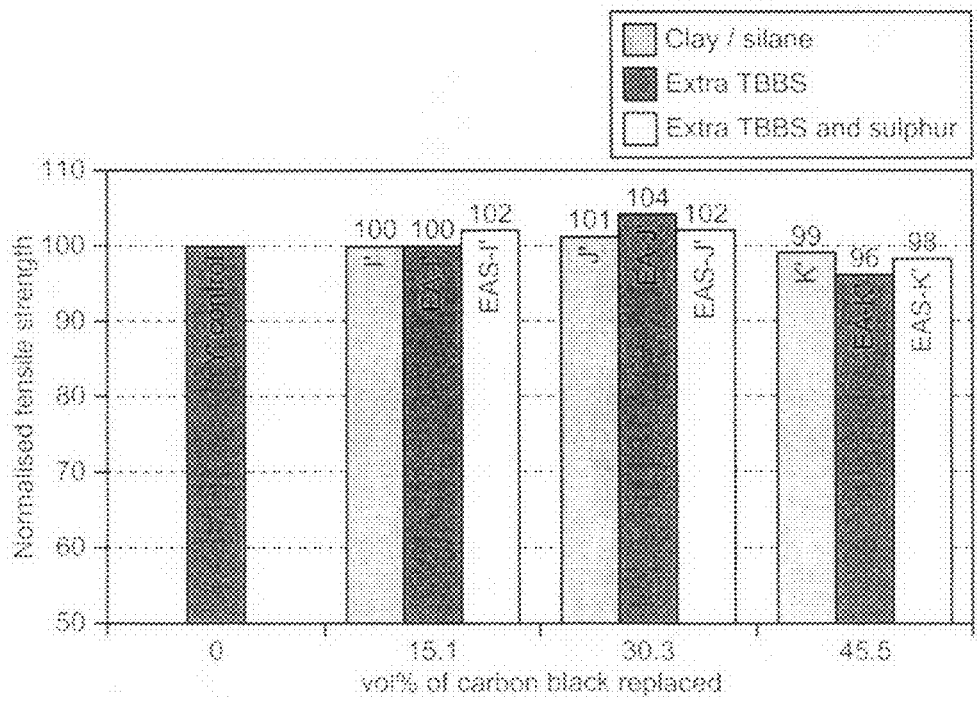
FIG. 16 is a bar chart illustrating the tensile strength of the same cured rubber compositions as shown in FIG. 13, against the same control.

Tensile strength for each of the same ten cured tyre tread compositions was determined using the test method already described. The results are shown in FIG. 16.

The results show that the tensile strength of the compositions containing silane-treated calcined kaolin is equivalent to that of the control.

Hardness Tests on Compositions I' to K'

Figure 17:
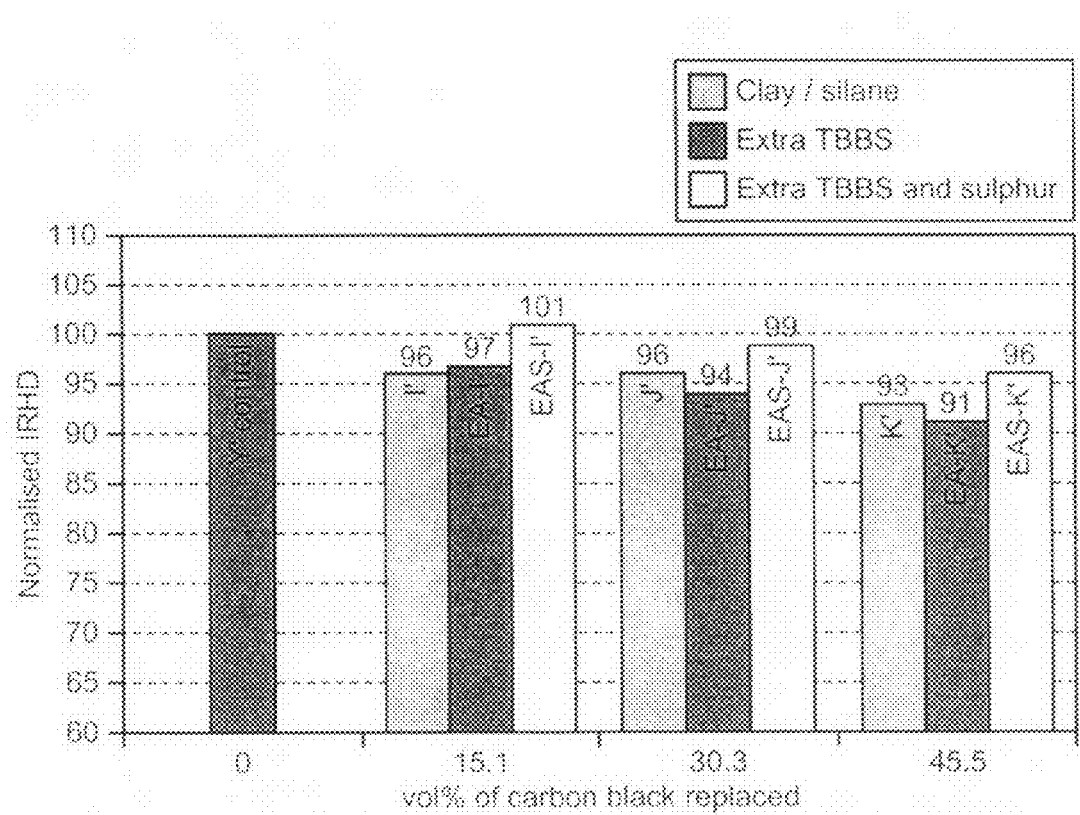
FIG. 17 is a bar chart illustrating the hardness of the same cured rubber compositions as shown in FIG. 13, against the same control.

Hardness of each of the same ten cured tyre tread compositions was determined using the test method already described. The results are shown in FIG. 17.

The results show that hardness is reduced by the presence of the silane-treated calcined kaolin product. Adding the combination of extra accelerant and sulphur restores the hardness to the control value for compositions containing up to 30 vol % of calcined kaolin.

Figure 18:
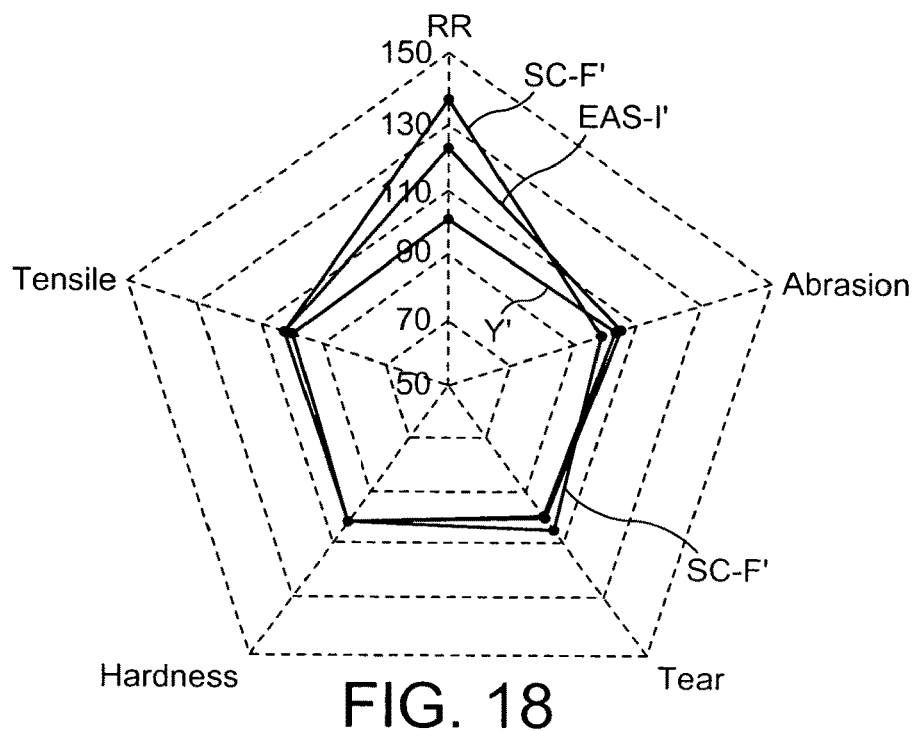
FIG. 18 is a diagram showing the interrelationship of the tested parameters in the cured truck tyre tread rubber compositions SC-F', EAS-I' and Y'.
Figure 19:
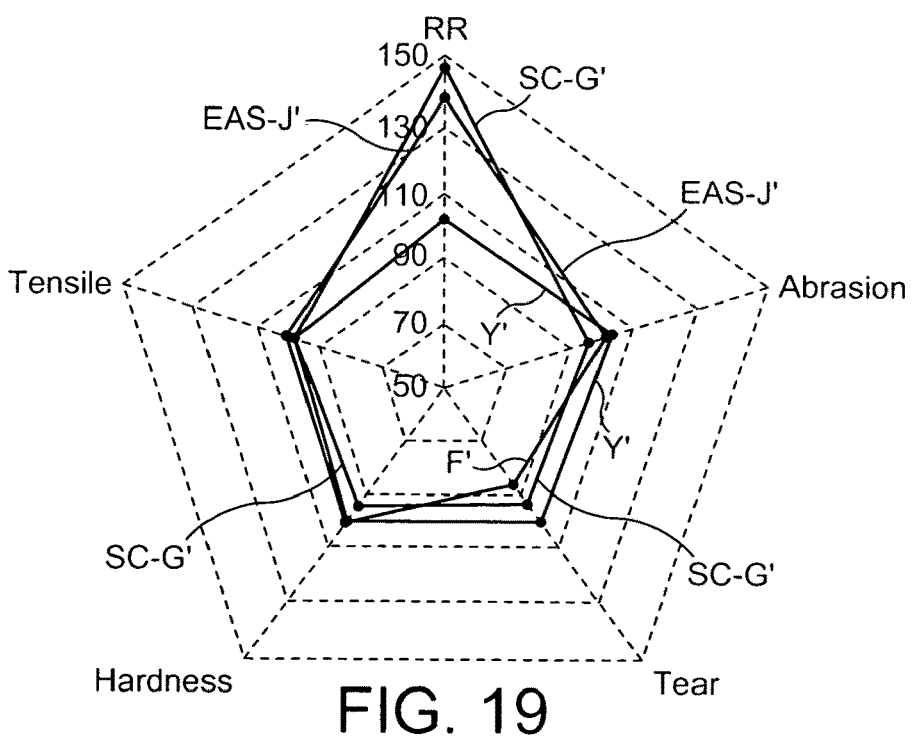
FIG. 19 is a diagram showing the interrelationship of the tested parameters in the cured truck tyre tread rubber compositions SC-G', EAS-J' and Y'.

Comparative Evaluation of Truck Tyre Tread Rubbers as Between Silica and Silanated Calcined Kaolin Replacing 15.1 vol % and 30.3 vol % of Carbon Black FIGS. 18 and 19 summarise the results illustrated in FIGS. 8 to 17, for the compositions of the invention where the best balance of properties appear to be indicated, against the control Y'. The compositions chosen were, at the 15% carbon replacement level, SC-F' and EAS-I' (FIG. 18); and, at the 30% carbon replacement level, SC-G' and EAS-J'. RR=rolling resistance; Tensile=tensile strength; Tear=tear strength; Abrasion=abrasion resistance. In general; the properties of the two carbon replacement materials were found to be similar. At the higher replacement level, silica performs worse than calcined kaolin in abrasion resistance and hardness, but gives better rolling resistance and tear.

However, the lower cost of kaolin and the avoidance of high temperature processing—as is necessary to prepare a silica-filled tread composition—are substantial benefits, making the kaolin filler an attractive alternative to silica.

Conclusion

A "green" (low rolling resistance and generally energy-efficient) tyre tread can be formulated using a particulate hydrous or calcined kaolin clay to replace at least part of the silica and/or carbon black in the rubber composition. The performance of the tread as measured in the laboratory is generally better than unfilled or carbon-filled rubber, and is generally similar to that obtained with a silica-based formulation. The processability of the masterbatch is generally improved, compared with known silica-based formulations. Moreover, in the particular case of truck tyre compositions, these advantages are achieved without the need for complicated high temperature compounding and at reduced cost (particularly, energy costs and reduced amounts of costly silica, carbon black and silane).

Achieving a good balance of properties (e.g. rolling resistance, abrasion resistance, tensile strength, tear strength and/or hardness) is not a straightforward exercise. For example, balancing low rolling resistance against high wet traction typically involves finding a rubber composition which exhibits high hysteresis (high energy absorption, correlating with good grip) at the high frequencies (typically in the range of from 10 to 10,000 kHz) experienced by the tyre tread under braking conditions, and low hysteresis (low energy absorption) at the low frequencies (typically in the range of from 10 to 100 Hz) associated with deflection of the tyre as it revolves. The calcined kaolin product, particularly a soak calcined product, may be preferred in this amongst the particulate kaolin clay products of the present invention, although all the products appear to have useful properties as tyre rubber fillers. The present invention makes available the possible use of higher levels of particulate filler than has hitherto been possible with silica and carbon blank.

The present invention therefore offers truck and automobile tyre manufacturers a more attractive, lower cost, route into the production of fuel-efficient tyres with acceptable performance characteristics, compared with current practice.

The foregoing broadly describes the present invention, without limitation. Variations and modifications as will be readily apparent to one of ordinary skill in this art are to be considered as included within the scope of this application and any subsequent patent(s).

The invention claimed is:

1. A rubber composition comprising rubber and a particulate kaolin clay having a particle size distribution such that at least 95% by volume of the particles have a particle diameter less than 2 μm and greater than 0% and less than 1% by volume of the kaolin particles have a particle diameter between 3 μm and 5 μm, wherein the rubber composition has a first abrasion resistance greater than a second abrasion resistance of the rubber composition being devoid of the particulate kalin clay having said particle size distribution.

2. A rubber composition according to claim 1, wherein at least 96% volume of the kaolin particles have a particle diameter less than 2 μm.

3. A rubber composition according to claim 1, wherein greater than 0% less than 40% by volume of the kaolin particles have a particle diameter between 1 μm and 5 μm.

4. A rubber composition according to claim 1, wherein less than 30% by volume of the kaolin particles have a particle diameter between 1 μm and 5 μm.

5. A rubber composition according to claim 1, wherein more than 30% by volume of the kaolin particles have a particle diameter less than 0.5 μm.

6. A rubber composition according to claim 1, wherein more than 40% by volume of the kaolin particles have a particle diameter less than 0.5 μm.

7. A rubber composition according to claim 1, wherein at least 7% by volume of the kaolin particles have a particle diameter less than 0.2 μm.

8. A rubber composition according to claim 1, wherein at least 10% by volume of the kaolin particles have a particle diameter less than 0.2 μm.

9. A rubber composition according to claim 1, wherein less than 1% by volume of the kaolin particles have a particle diameter between 3 μm and 5 μm, and less than 40% by volume of the kaolin particles have a particle diameter between 1 μm and 5 μm.

10. A rubber composition according to claim 1, wherein the kaolin is a calcined kaolin.

11. A rubber composition according to claim 10, wherein the calcined kaolin is a soak calcined kaolin.

12. A rubber composition according to claim 11, wherein the calcined kaolin is a flash calcined kaolin.

13. A rubber composition according to claim 1, wherein the particulate kaolin clay is present in an amount between 5 phr and 50 phr.

14. A rubber composition according to claim 1, further comprising silica.

15. A tire tread formed from a cured rubber composition comprising the rubber composition according to claim 1.

16. The tire tread of claim 15, wherein the cured rubber composition has a tan δ at 75° C. and 10 Hz less than 0.08 under the test method described herein, together with one or more of: an abrasion resistance under the DIN test method described herein of less than 185 cubic millimeters volume loss; a tensile strength of greater than 25 MPa; a crescent tear strength under the test method described herein of greater than 120 N/mm; and a hardness under the test method described herein of greater than 58 IRHD.

* * * * *